(12) United States Patent
Wiesner et al.

(10) Patent No.: US 12,420,238 B2
(45) Date of Patent: Sep. 23, 2025

(54) ASYMMETRIC MULTIBLOCK COPOLYMER-HOMOPOLYMER FILMS, METHODS OF MAKING SAME, AND USES THEREOF

(71) Applicant: Cornell University, Ithaca, NY (US)

(72) Inventors: Ulrich B. Wiesner, Ithaca, NY (US); Yusuke Hibi, Shizuoka (JP)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 18/262,633

(22) PCT Filed: Jan. 22, 2022

(86) PCT No.: PCT/US2022/013430
§ 371 (c)(1),
(2) Date: Jul. 24, 2023

(87) PCT Pub. No.: WO2022/159780
PCT Pub. Date: Jul. 28, 2022

(65) Prior Publication Data
US 2024/0100485 A1 Mar. 28, 2024

Related U.S. Application Data

(60) Provisional application No. 63/140,718, filed on Jan. 22, 2021.

(51) Int. Cl.
*B01D 67/00* (2006.01)
*B01D 69/02* (2006.01)
(Continued)

(52) U.S. Cl.
CPC .... *B01D 67/00111* (2022.08); *B01D 67/0009* (2013.01); *B01D 69/02* (2013.01);
(Continued)

(58) Field of Classification Search
CPC ............ B01D 67/00111; B01D 71/281; B01D 67/0009; B01D 69/02; B01D 71/44
See application file for complete search history.

(56) References Cited

U.S. PATENT DOCUMENTS

| 2009/0173694 A1 | 7/2009 | Peinemann et al. |
| 2012/0318741 A1 | 12/2012 | Peinemann et al. |

(Continued)

FOREIGN PATENT DOCUMENTS

| DE | 102012207338 A1 | 11/2013 |
| WO | 2012151482 A2 | 11/2012 |

(Continued)

OTHER PUBLICATIONS

Rahman et al., "Selective Swelling and Functionalization of Integral Asymmetric Isoporous Block Copolymer Membranes," Advanced Science News: Macromolecular Rapid Communication 2021, 42, 2100235, 12 pages.

(Continued)

*Primary Examiner* — Nathan T Leong
(74) *Attorney, Agent, or Firm* — Young Basile Hanlon & MacFarlane, P.C.

(57) ABSTRACT

Asymmetric films, methods of making asymmetric films, and uses of asymmetric films. A method may include using at least two different solvents and at least one homopolymer and at least one block copolymer that can undergo self assembly, where the solvents are immiscible and have different surface tension, where, on film formation, all or substantially all of the block copolymer(s) migrate to an exterior surface of the homopolymer. The asymmetric films may include an isoporous region or layer and an asymmetric region or layer, where the asymmetric region does not include 10 percent by weight or more of the multiblock copolymer(s) and/or the isoporous region/layer and the asymmetric pore region/layer are not independently (or (Continued)

separately) formed and/or not laminated together to form the asymmetric film. The films can be used in devices, such as, for example, filtration devices.

22 Claims, 23 Drawing Sheets

(51) Int. Cl.

| | |
|---|---|
| *B01D 71/28* | (2006.01) |
| *B01D 71/44* | (2006.01) |
| *B01D 71/68* | (2006.01) |
| *B01D 71/80* | (2006.01) |
| *C08F 212/08* | (2006.01) |
| *C08F 226/06* | (2006.01) |
| *C08J 5/18* | (2006.01) |
| *C08K 3/22* | (2006.01) |
| *C08L 53/00* | (2006.01) |
| *C08L 81/06* | (2006.01) |

(52) U.S. Cl.
CPC .......... *B01D 71/281* (2022.08); *B01D 71/44* (2013.01); *B01D 71/68* (2013.01); *B01D 71/80* (2013.01); *C08F 212/08* (2013.01); *C08F 226/06* (2013.01); *C08J 5/18* (2013.01); *C08K 3/22* (2013.01); *C08L 53/00* (2013.01); *C08L 81/06* (2013.01); *B01D 2325/0233* (2022.08); *C08K 2003/2241* (2013.01); *C08K 2201/011* (2013.01)

(56) References Cited

U.S. PATENT DOCUMENTS

| | | | |
|---|---|---|---|
| 2014/0217012 A1* | 8/2014 | Wiesner | ............... B01D 71/261 |
| | | | 264/41 |
| 2015/0151256 A1 | 6/2015 | Abetz et al. | |
| 2016/0229969 A1* | 8/2016 | Wiesner | ............... B01D 71/281 |
| 2017/0327649 A1 | 11/2017 | Wiesner et al. | |
| 2019/0178045 A1 | 6/2019 | Frazier et al. | |
| 2020/0122091 A1 | 4/2020 | Peinemann et al. | |
| 2021/0008507 A1 | 1/2021 | Dorin et al. | |

FOREIGN PATENT DOCUMENTS

| | | |
|---|---|---|
| WO | 2020028079 A1 | 2/2020 |
| WO | 2020165803 A1 | 8/2020 |
| WO | 2021101704 A2 | 5/2021 |
| WO | 2021124011 A1 | 6/2021 |

OTHER PUBLICATIONS

Rangou et al., "Self-organized isoporous membranes with tailored pore sizes," Journal of Membrane Science (2013) Elsevier, DOI: 10.1016/j.memsci.2013.10.015, 26 pages.

* cited by examiner

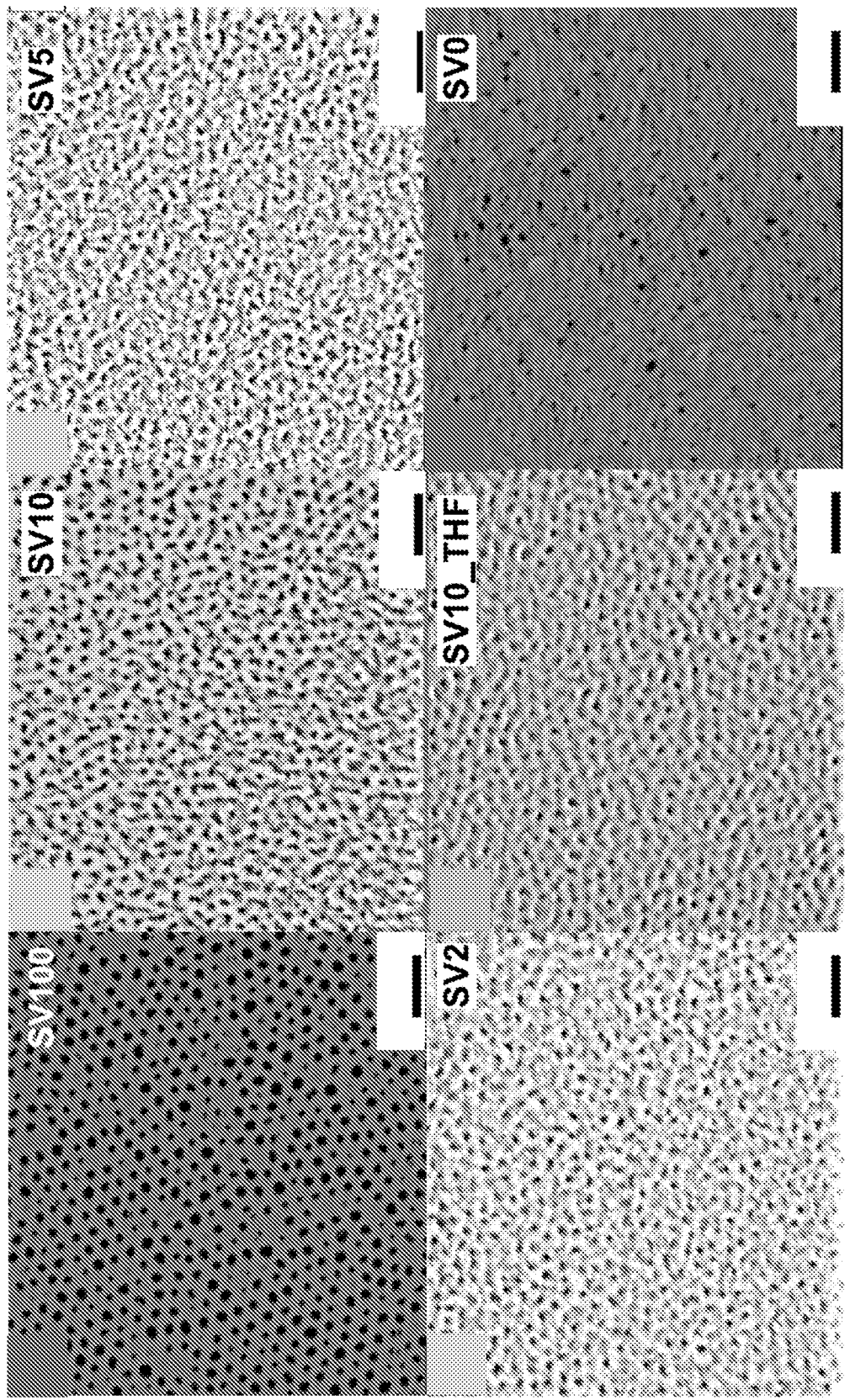

SE image    Sulfur

SE image    Sulfur

ASYMMETRIC MULTIBLOCK COPOLYMER-HOMOPOLYMER FILMS, METHODS OF MAKING SAME, AND USES THEREOF

CROSS-REFERENCE TO RELATED APPLICATIONS

This application is a U.S. National Stage Entry of International Patent Application No. PCT/US22/13430, which claims the benefit of U.S. Provisional Patent Application No. 63/140,718, filed Jan. 22, 2021, the contents of the above-identified application are hereby fully incorporated herein by reference in their entirety.

STATEMENT REGARDING FEDERALLY SPONSORED RESEARCH

This invention was made with government support under grant no. DMR-1104773 awarded by the National Science Foundation. The government has certain rights in the invention.

BACKGROUND OF THE DISCLOSURE

Surface segregation in blended polymer films has attracted much interest in fundamental research as well as for practical applications. A variety of methodologies have been proposed for controlling surface segregation. They often require long annealing times, however, to achieve thermodynamic equilibrium.

BCP-based asymmetric ultrafiltration (UF) membranes are a representative class of materials derived from transient non-equilibrium processes. First reported in 2007, and subsequently named SNIPS membranes, they simultaneously exploit BCP self-assembly (S) and industrially proven non-solvent induced phase separation (NIPS). First SNIPS membranes exhibited a self-assembled and often periodically ordered mesoporous top separation layer with hexagonal or square lattice. It sits on top of a disordered asymmetric substructure with hierarchically organized meso- to macro-pores. The BCP self-assembly based top surface pore layer was obtained by immersing a doctor-bladed BCP-solution in a water bath after a certain amount of waiting time post-doctor blading (typically of order of a minute), which quenches the transient evolution of BCP self-assembly into a porous structure induced by the solvent evaporation. BCP self-assembly minimized pore size distribution and maximized pore number-density at the surface, giving rise to higher resolution and flux in separation applications, respectively, as compared to conventional NIPS-derived homopolymer membranes.

Despite these favorable performance characteristics, a significant obstacle to the wider use of BCP-based SNIPS-derived UF membranes may be their higher costs relative to homopolymer NIPS derived conventional UF membranes. Typically, more than about 99% of the volume of the SNIPS membranes is occupied by the disordered substructure. One way to reduce costs associated with BCP-based SNIPS-derived UF membranes is laminating two separate membranes together, i.e., a thin BCP and a thick homopolymer one, but this would be time consuming and difficult, however, as the BCP film would only be of order 100 nm thick, which is difficult to handle over large areas, e.g., in roll-to-roll-type industrial formation formats.

BRIEF SUMMARY OF THE DISCLOSURE

In an aspect, the present disclosure provides methods of making asymmetric films. A film may be referred to herein, in the alternative, as a multiblock copolymer-homopolymer film, an asymmetric organic film, a hybrid film, a bilayer film, or a surface segregated film. In various examples, an asymmetric film is a membrane (which may be an ultrafiltration (UF) membrane). The methods use a deposition solution (also referred to as a dope or casting solution) comprising one or more multiblock copolymer(s), one or more homopolymer(s), and at least two solvents. In various examples, a deposition solution does not exhibit observable phase separation at the time of membrane formation. In various examples, a method comprises only a single film deposition (e.g., film casting) step. The films have a structure comprising a separation layer and a support layer. In various examples, the films are graded. In various examples, a film is made by a method disclosed herein. In various examples, the method is the $^S$NIPS process.

In various examples, a method (which may be a method for forming a film from a deposition solution comprising two or more polymer species and two or more solvents, which may be without any annealing process), allows for predetermination of the relative position of at least a portion of or all of the polymer constituents in the final film by the choice of solvents. A deposition solution may comprise one or more metal salt(s). In various examples, a deposition solution further comprises inorganic nanoparticles. A deposition solution may further comprise one or more additive(s).

At least a portion of the solvents in the solvent system is removed from the film after the film is formed from the deposition solution (initial film) prior to contacting the film with a phase separation solvent system. After solvent removal, the film is contacted with a phase separation solvent system. The solvent system can be a single solvent or a mixture of solvents.

In an aspect, the present disclosure provides compositions. A composition may be a deposition solution, which may be used in a method of the present disclosure. In various examples, a composition comprises the components of a deposition solution of the present disclosure. In various examples, a composition comprises at least two solvents, one or more multiblock copolymer(s), and one or more homopolymer(s). In various examples, a composition further comprises one or more metal salt(s) and/or one or more additive(s) (e.g., porogen(s), additive homopolymer(s), small molecule(s), or the like, or any combination thereof).

In an aspect, the present disclosure provides films (which may be referred to, in the alternative, as a multiblock copolymer-homopolymer films, asymmetric films, as asymmetric organic films, hybrid films, bilayer films, or surface segregated films). In various examples, a film is a membrane (which may be an ultrafiltration (UF) membrane). A film comprises at least one multiblock copolymer and at least one homopolymer. In various examples, a film is disposed on a substrate or is a free-standing film. A film may be a dense film or a porous film. In various examples, a film comprises an isoporous region (e.g., an isoporous layer), which may be referred to, in the alternative, as a surface region/layer, and an asymmetric pore region (e.g., an asymmetric pore layer), which may be referred to, in the alternative, as a support region/layer asymmetric pore substructure, asymmetric pore bulk region/layer. In various examples, the asymmetric pore region/layer does not have 10 percent by weight or more, 5 percent by weight or more, 1 percent by weight or more, 0.5 percent by weight by weight or more multiblock copolymer(s) (based on the total weight of multiblock copolymer(s) and homopolymer(s) in the asymmetric pore region/layer).

In an aspect, the present disclosure provides uses of the films of the present disclosure. The films can be used in applications such as, for example, filtration applications (e.g., chemical/biological molecule separations, and water purification), drug delivery, molecular sensing, and the like. For example, a film or films can be used as filtration media in a filtration device (e.g., ultrafiltration device or the like) for concentration and/or purification of proteins, viruses, or other dissolved material, as a separation media for liquids, vapors (i.e., gas), or solutions, or the like. A film can also be used as a penetrable catalyst support substrate or the like.

In an aspect, the present disclosure provides devices comprising a film of the present disclosure. For example, the films can be used as filtration membranes in filtration devices (e.g., ultrafiltration devices) for concentration and/or purification or proteins, viruses, or other dissolved material, as a separation media for liquids, vapors (i.e., gas), solutions, or the like, or the like.

BRIEF DESCRIPTION OF THE FIGURES

For a fuller understanding of the nature and objects of the disclosure, reference should be made to the following detailed description taken in conjunction with the accompanying figures in the Example.

FIG. 3A is the same figure as FIG. 5B.

FIGS. 6A-6N show SV:(PSf+PVP) binary blend $^S$NIPS coded based on SV fraction. (FIG. 6A-6F) SEM surface images of (FIG. 6A) SV100 (pure SV), (FIG. 6B) SV10, (FIG. 6C) SV5, (D) SV2, (FIG. 6E) SV10_THF and (FIG. 6F) SV0 (pure PSf+PVP). All scale bars for FIG. 6A-6F are 200 nm (nm=nanometer(s)). All membranes were casted from DOX/NMP solution except for (FIG. 6E) SV10_THF, which was casted from THF/NMP. The ratio of PSf:PVP was fixed at 75:25 in all cases. (FIG. 6J-6N) Cross-sectional SEM images with higher resolution insets of (FIG. 6J) SV100, (FIG. 6K) SV10, (FIG. 6L) SV5, (FIG. 6M) SV2 and (FIG. 6N) SV0.

(FIG. 9A) GPC curves before (black; feed solution) and after passing through blended membranes of 100:0, 10:90, 5:95, 2:98, and 0:100 SV/PSf blend ratio (as indicated). Reduction of peak area by passing through the membrane provides a measure for rejection efficiency for each molar mass PEG. (FIGS. 9B-9C) In order to carefully compare rejection efficiencies of (FIG. 9B) SV10_THF and (FIG. 9C) BioMax, which had a similar rejection range, the filtration of additional PEG (6k) was examined. In order to draw rejection efficiency curves in FIG. 10A, the weight average molar mass ($M_w$) of the PEO solutes was converted to hydrodynamic size according to the following equation: $R_H=0.0145 \text{ Mw}^{0.571}$ nm.

(FIG. 10A) Rejection curves as a function of hydrodynamic diameter of PEG solute. Rejection was calculated from peak areas of GPC curves (see FIG. 9). (FIG. 10B) Pure water flux (left column) and PEG solution (0.24 percent by weight) flux (right column) for different membranes studied. BioMax is a PES membrane with 10k MWCO sold by Millipore.

(FIG. 11A) Cross-section EDX of PS/PSf (without PVP) bilayer membrane. The solid line shows the boundary of the surface and cross-section, whereas the dashed-line shows the boundary of PS skin-layer and PSf substructure. (FIG. 11B) Cross-section EDX of SAA/PES (without PVP) bilayer membrane. The skin layer was not clearly observed under the EDX conditions. The solid line shows the boundary of the surface and cross-section. (FIGS. 11C-11D) Surface SEM images of (FIG. 11C) pure SAA membrane and (FIG. 11D) SAA/PES bilayer membrane. (FIG. 11E) FFT 1D profiles for pure SAA, binary SAA/PES, and pure PES membranes. The pure SAA and binary SAA/PES membranes exhibited similar correlation lengths of surface pore structure, while the pure PES membrane did not reveal a characteristic correlation peak.

DETAILED DESCRIPTION OF THE DISCLOSURE

The present disclosure provides asymmetric films. Also provided are methods of making such films and uses of such films.

The present disclosure describes, inter alia, a strategy to achieve surface segregation of a block-copolymer (BCP) layer on top of a homopolymer applicable in a single casting step. A strategy is described to achieve surface segregation ensuring BCP self-assembly derived surface pore structures. Without intending to be bound by any particular theory, it is considered that surface segregation is caused when two kinds of solvents with different surface energies are employed, each of which is selective for one of the two polymers used (i.e., BCP versus homopolymer), respectively, suggesting that the polymeric species preferentially adsorbing the lower surface energy solvent comes up to the surface. This should be distinguished from the conventional surface segregation phenomena based on surface energy differences between polymer species requiring long annealing time.

Figure 1:
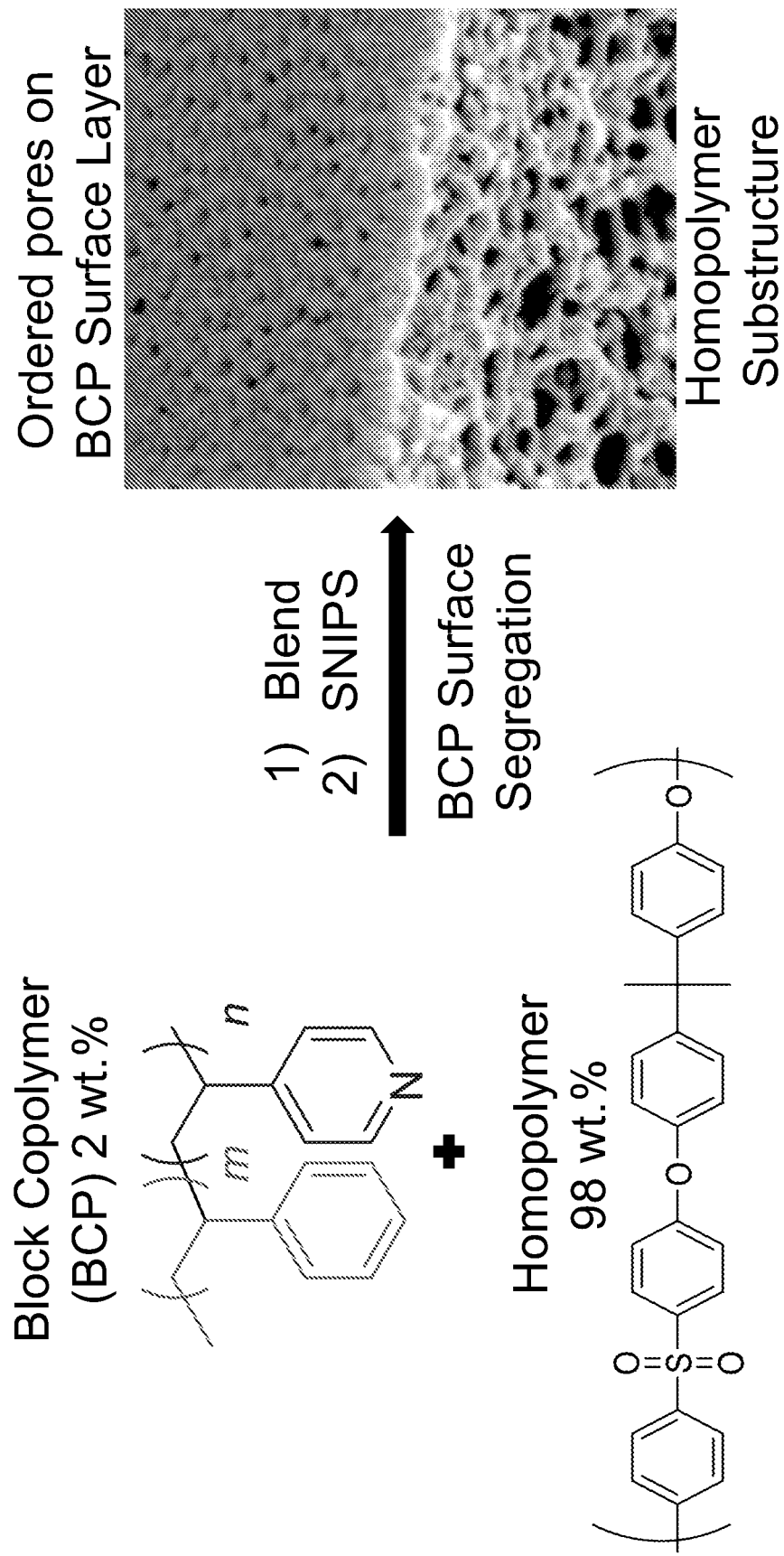
FIG. 1 shows a general scheme for a one step process toward a bilayer membrane composed of BCP which self-assembles into a porous surface separation layer on top of an asymmetric homopolymer substructure casted from BCP/homopolymer blend solutions.

The surface energies of solvents are typically more dominant than those of the polymers, allowing control of surface segregation beyond general surface energy rules for polymers alone. In various examples, surface coverage with a BCP self-assembly based top surface separation layer over the entire membrane was achieved within a minute of solvent evaporation in the NIPS process down to BCP weight fractions as low as 2% (see FIG. 1). This is facilitated by choosing BCP/homopolymer/solvent systems with consideration for solvent surface energies and/or solvent-polymer interaction parameters ($\chi_{solvent-polymer}$). This new process is referred to as $^S$NIPS in order to distinguish it from conventional NIPS and SNIPS approaches, respectively.

In various examples, the surface coverage by the minor constituent BCP was accomplished in the casted solution within the time scale of a minute of solvent evaporation despite almost identical surface energies of BCP and homopolymer constituents. Immersing this casted solution into water for non-solvent induced phase separation (NIPS) afforded solidified bilayer membranes composed of a porous surface layer of self-assembled BCP atop an asymmetric porous homopolymer substructure. In various examples, successful BCP surface segregation followed from the choice of a binary solvent system based on considerations of solvent surface energies and polymer-solvent interaction parameters. Methods described herein provide cost-effective methods to control surface segregation in a non-equilibrium process for the fabrication of films, which may be bilayer-type asymmetric UF membranes with BCP self-assembly based selective top surface pore layers, in a single casting step.

Ranges of values are disclosed herein. The ranges set out a lower limit value and an upper limit value. Unless otherwise stated, the ranges include the lower limit value, the upper limit value, and all values between the lower limit value and the upper limit value, including, but not limited to, all values to the magnitude of the smallest value (either the lower limit value or the upper limit value) of a range. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also, unless otherwise stated, include individual values (e.g., about 1%, about 2%, about 3%, about 4%, etc.) and the sub-ranges (e.g., about 0.5% to about 1.1%, about 0.5% to about 2.4%, about 0.5% to about 3.2%, about 0.5% to about 4.4%, and other possible sub-ranges) within the indicated range. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about, it will be understood that the particular value forms a further disclosure. For example, if the value "about 10" is disclosed, then "10" is also disclosed.

As used herein, unless otherwise indicated, "about" or "the like", when used in connection with a measurable variable (such as, for example, a parameter, an amount, a temporal duration, or the like) or a list of alternatives, is meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosed invention. As used herein, the terms "about" may mean that the amount or value in question is the exact value or a value that provides equivalent results or effects as recited in the claims or taught herein. That is, it is understood that amounts, sizes, compositions, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, composition, parameter or other quantity or characteristic is "about," whether or not expressly stated to be such. It is understood that where "about," is used before a quantitative value, the parameter also includes the specific quantitative value itself, unless specifically stated otherwise.

As used herein, unless otherwise stated, equivalent circular diameter means the diameter of the smallest circle which entirely encloses an object. This term is used to describe the size of non-symmetric objects. For example, the size of non-symmetric pores in the support layer is referred to as equivalent circular support layer pore diameter.

As used herein, unless otherwise stated, small molecule means a molecule having a molar mass of 1000 g/mol or less. For example, the small molecule is an organic molecule.

As used herein, unless otherwise stated, the term "group" refers to a chemical entity that is monovalent (i.e., has one terminus that can be covalently bonded to other chemical species), divalent, or polyvalent (i.e., has two or more termini that can be covalently bonded to other chemical species). The term "group" also includes radicals (e.g., monovalent and multivalent, such as, for example, divalent radicals, trivalent radicals, and the like). Illustrative examples of groups include:

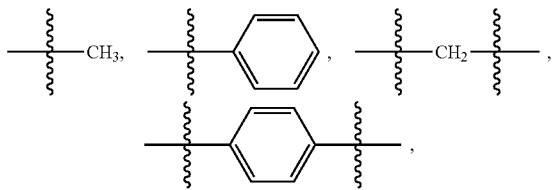

In an aspect, the present disclosure provides methods of making asymmetric films. A film may be referred to herein, in the alternative, as a multiblock copolymer-homopolymer film, an asymmetric organic film, a hybrid film, a bilayer film, or a surface segregated film. In various examples, an asymmetric film is a membrane (which may be an ultrafiltration (UF) membrane). The methods use a deposition solution (also referred to as a dope or casting solution) comprising one or more multiblock copolymer(s), one or more homopolymer(s), and at least two solvents. In various examples, a deposition solution does not exhibit observable phase separation at the time of membrane formation. In various examples, a method comprises only a single film deposition (e.g, film casting) step. The films have a structure comprising a separation layer and a support layer. In various examples, the films are graded. In various examples, a film is made by a method disclosed herein. In various examples, the method is the $^S$NIPS process described in the Example. Non-limiting examples of making asymmetric (multiblock copolymer-homopolymer) films are provided herein.

It was surprisingly found that films could be formed using a conventional non-solvent induced phase separation (NIPS) approach to ultrafiltration membranes, by using a BCP/homopolymer blended membrane dope solution comprising at least two solvents, which in turn could then be submitted to the NIPS membrane formation process. The minority BCP component in the casting solution surface segregated during the NIPS process providing a BCP self-assembly derived porous surface layer disposed on an asymmetric support layer.

In various examples, a method (which may be a method for forming a film from a deposition solution comprising two or more polymer species and two or more solvents, which may be without any annealing process), allows for predetermination of the relative position of at least a portion of or all of the polymer constituents in the final film by the choice of solvents.

A deposition solution is used to form a film comprising the multiblock copolymer on the substrate. The film (as deposited and prior to further processing) may be referred to as an initial film. The deposition solution comprises at least one multiblock copolymer, at least one homopolymer, optionally, metal salt(s), optionally, inorganic nanoparticles, optionally, additive(s), and at least two solvents.

Any substrate on which a layer comprising a multiblock copolymer can be formed can be used. A wide range of substrate materials, sizes, and shapes can be used. The substrate can be solid or porous. Examples of suitable substrates include, but are not limited to, glass plates or rods, silicon, plastic (e.g., Teflon™) porous film supports (such as, for example, non-woven polyester, and the like), and the like, and any combination thereof. For example, non-woven polyester on top of glass is used as a substrate.

A variety of multiblock copolymers can be used. Combinations of different (e.g., compositionally different, structurally different, different in molecular weight, or the like, or a combination thereof) multiblock copolymers can be used. A multiblock copolymer may comprise at least two polymer blocks that are able to form micelles in the chosen solvent system. A multiblock copolymer may have at least two blocks that can microphase separate (e.g., microphase separate in a film). By microphase separation it is meant that the multiblock copolymers self-assemble into structures (e.g., micelles, hexagonally-packed cylinders, disordered but mesophase structure, or the like) comprising mesoscale domains (e.g., domains having thickness of 2 nm to 50 nm). In various examples, a mesoporous domain is comprised of one block of the block copolymer and is adjacent to a mesoporous domain of a chemically distinct block of the block copolymer. A film may comprise multiple chemically distinct domains depending on the number of blocks in the multiblock copolymer.

Multiblock copolymers can be synthesized by methods known in the art. For example, the copolymers are synthesized using anionic polymerization, atom transfer radical polymerization (ATRP), or other suitable polymerization techniques. Suitable multiblock copolymers can also be obtained commercially.

In various examples, a multiblock copolymer has a structure of form A-B or A-B-A or A-B-C, where A or B or C is polystyrene, poly-4-vinylpyridine, poly-2-vinylpyridine, polybutadiene, polyisoprene, poly(ethylene-stat-butylene), poly(ethylene-alt-propylene), polysiloxane, polyalkylenoxide, poly-ε-caprolactone, polylactide, polyalkylmethacrylate, polymethacrylic acid, polyalkylacrylate, polyacrylic acid, polyhydroxyethylmethacrylate, polyacrylamide, poly-N-alkylacrylamide, polyethylene oxide, polydimethylaminoethylmethacrylate, poly-tert-butylstyrene, or polyhydroxystyrene. In various examples, the multiblock copolymer is a triblock terpolymer having a structure of the form A-B-C, or A-C-B, or other variable arrangements or containing blocks of different chemical composition. In other embodiments, additional structures are higher order multi-block copolymer systems of the form A-B-C-B, or A-B-C-D, or A-B-C-B-A, or A-B-C-D-E, or other variable arrangements of these higher order systems.

Non-limiting examples of suitable diblock copolymers include poly(styrene)-b-poly((4-vinyl)pyridine), poly(styrene)-b-poly((2-vinyl) pyridine), poly(styrene)-b-poly(ethylene oxide), poly(styrene)-b-poly(methyl methacrylate), poly(styrene)-b-poly(acrylic acid), poly(styrene)-b-poly(dimethylethyl amino ethyl methacrylate), poly(styrene)-b-poly(hydroxystyrene), poly(α-methyl styrene)-b-poly((4-vinyl)pyridine), poly(α-methyl styrene)-b-poly((2-vinyl) pyridine), poly(α-methyl styrene)-b-poly(ethylene oxide), poly(α-methyl styrene)-b-poly(methyl methacrylate), poly (α-methyl styrene)-b-poly(acrylic acid), poly(α-methyl styrene)-b-poly(dimethylethyl amino ethyl methacrylate), poly (α-methyl styrene)-b-poly(hydroxystyrene), poly(isoprene)- b-poly((4-vinyl)pyridine), poly(isoprene)-b-poly((2-vinyl) pyridine), poly(isoprene)-b-poly(ethylene oxide), poly(isoprene)-b-poly(methyl methacrylate), poly(isoprene)-b-poly (acrylic acid), poly(isoprene)-b-poly(dimethylethyl amino ethyl methacrylate), poly(isoprene)-b-poly(hydroxystyrene), poly(butadiene)-b-poly((4-vinyl)pyridine), poly(butadiene)-b-poly((2-vinyl) pyridine), poly(butadiene)-b-poly (ethylene oxide), poly(butadiene)-b-poly(methyl methacrylate), poly(butadiene)-b-poly(acrylic acid), poly (butadiene)-b-poly(dimethylethyl amino ethyl methacrylate), poly(butadiene)-b-poly(hydroxystyrene), poly(4-tert-butylstyrene)-b-poly((4-vinyl)pyridine), poly(4-tert-butylstyrene)-b-poly((2-vinyl) pyridine), poly(4-tert-butylstyrene)-b-poly(ethylene oxide), poly(4-tert-butylstyrene)-b-poly(methyl methacrylate), poly(4-tert-butylstyrene)-b-poly(acrylic acid), poly(4-tert-butylstyrene)-b-poly(dimethylethyl amino ethyl methacrylate), poly(hydroxystyrene)-b-poly((4-vinyl)pyridine), poly(hydroxystyrene)-b-poly((2-vinyl) pyridine), poly(hydroxystyrene)-b-poly(ethylene oxide), and the like, and any combination thereof.

Non-limiting examples of suitable triblock copolymers include poly(isoprene-b-styrene-b-4-vinylpyridine), poly (isoprene)-b-poly(styrene)-b-poly((4-vinyl)pyridine), poly (isoprene)-b-poly(styrene)-b-poly((2-vinyl) pyridine), poly (isoprene)-b-poly(styrene)-b-poly(ethylene oxide), poly (isoprene)-b-poly(styrene)-b-poly(methyl methacrylate), poly(isoprene)-b-poly(styrene)-b-poly(acrylic acid), poly (isoprene)-b-poly(styrene)-b-poly(dimethylethyl amino ethyl methacrylate), poly(isoprene)-b-poly(styrene)-b-poly (hydroxystyrene), poly(isoprene)-b-poly(α-methyl styrene)-b-poly((4-vinyl)pyridine), poly(isoprene)-b-poly(α-methyl styrene)-b-poly((2-vinyl) pyridine), poly(isoprene)-b-poly (α-methyl styrene)-b-poly(ethylene oxide), poly(isoprene)-b-poly(α-methyl styrene)-b-poly(methyl methacrylate), poly(isoprene)-b-poly(α-methyl styrene)-b-poly(acrylic acid), poly(isoprene)-b-poly(α-methyl styrene)-b-poly(dimethylethyl amino ethyl methacrylate), poly(butadiene)-b-poly(styrene)-b-poly((4-vinyl)pyridine), poly(butadiene)-b-poly(styrene)-b-poly((2-vinyl) pyridine), poly(butadiene)-b-poly(styrene)-b-poly(ethylene oxide), poly(butadiene)-b-poly(styrene)-b-poly(methyl methacrylate), poly (butadiene)-b-poly(styrene)-b-poly(acrylic acid), poly (butadiene)-b-poly(styrene)-b-poly(dimethylethyl amino ethyl methacrylate), poly(butadiene)-b-poly(styrene)-b-poly (hydroxystyrene), poly(butadiene)-b-poly(α-methyl styrene)-b-poly((4-vinyl)pyridine), poly(butadiene)-b-poly(α-methyl styrene)-b-poly((2-vinyl) pyridine), poly (butadiene)-b-poly(α-methyl styrene)-b-poly(ethylene oxide), poly(butadiene)-b-poly(α-methyl styrene)-b-poly (methyl methacrylate), poly(butadiene)-b-poly(α-methyl styrene)-b-poly(acrylic acid), poly(butadiene)-b-poly(α-methyl styrene)-b-poly(dimethylethyl amino ethyl methacrylate), poly(butadiene)-b-poly(styrene)-b-poly(hydroxystyrene), poly(isoprene-b-4-tertbutylstyrene-b-4-vinylpyridine), poly(isoprene)-b-poly(4-tertbutylstyrene)-b-poly((4-vinyl)pyridine), poly(isoprene)-b-poly(4-tertbutylstyrene)-b-poly((2-vinyl) pyridine), poly(isoprene)-b-poly(4-tertbutylstyrene)-b-poly(ethylene oxide), poly (isoprene)-b-poly(4-tertbutylstyrene)-b-poly(methyl methacrylate), poly(isoprene)-b-poly(4-tertbutylstyrene)-b-poly(acrylic acid), poly(isoprene)-b-poly(4-tertbutylstyrene)-b-poly(dimethylethyl amino ethyl methacrylate), poly (isoprene)-b-poly(4-tertbutylstyrene)-b-poly (hydroxystyrene), and the like, and any combination thereof.

In various examples, a multiblock copolymer has at least one hydrogen-bonding block. A hydrogen-bonding block can self-assemble with another structurally distinct polymer block of the multiblock copolymer (e.g., a hydrophobic block or the like). The hydrogen-bonding block comprises an acceptor group or donor group that can participate in intramolecular hydrogen bonding. The hydrogen-bonding block can be a hydrophilic block. Non-limiting examples of suitable hydrogen-bonding blocks include poly((4-vinyl) pyridine), poly((2-vinyl) pyridine), poly(ethylene oxide), poly(methacrylatexs), such as, for example, poly(methacrylate), poly(methyl methacrylate), poly(dimethylethyl amino ethyl methacrylate), and the like), poly(acrylic acid), poly (hydroxystyrene), and the like, and any combination thereof. In various examples, the hydrophilic block(s) is/are poly((4-vinyl)pyridine). In these examples, the multiblock copolymer has additional blocks that are hydrophobic blocks. In various examples, the hydrophobic blocks form the matrix of the film. For example, a multiblock copolymer has one or two hydrophobic block(s) in addition to the hydrogen-bonding block(s). Examples of suitable hydrophobic blocks include, but are not limited to, poly(styrenes) (such as, for example, poly(styrene), poly(alpha-methyl styrene), and the like), polyethylene, polypropylene, polyvinyl chloride, poly-tert-butylstyrene, polytetrafluoroethylene, and the like, and any combination thereof.

In various examples, at least one of the additional hydrophobic blocks is a low glass transition temperature $(T_g)$ block. By low $T_g$ block it is meant that the block has a $T_g$ of about 25° C. or less. The multiblock copolymer can have multiple low $T_g$ blocks. Examples of suitable low $T_g$ blocks include, but are not limited to, poly(isoprene), poly(butadiene), poly(butylene), poly(isobutylene), and the like, and any combination thereof. In various examples, the multiblock copolymer comprises a low $T_g$ polymer block, a poly(styrene) block, and a poly((4-vinyl) pyridine) block.

The individual polymer blocks of a multiblock copolymer can have a broad molecular weight range. In various examples, individual blocks have a number averaged molecular weight $(M_n)$ of about $1 \times 10^3$ to 1×about $10^6$ g/mol, including all values to the 10 g/mol and ranges therebetween.

The total molar mass of the multi-block copolymer is such that the multiblock copolymer undergoes self-assembly (i.e., microphase separation). It is desirable that defect-free surfaces are formed upon meso- and macro-porous structure formation. In various examples, the total molar mass of the multiblock copolymer is from about $5 \times 10^3$ to about $5 \times 10^5$ g/mol, including all values to the 10 g/mol and ranges therebetween.

Multiblock copolymers can have a range of polydispersities $(M_w/M_n)$. In various examples, a multiblock copolymer has a polydispersity index (PDI) of about 1.0 to about 2.0, including all values to the 0.1 and ranges therebetween. It is desirable that a multiblock copolymer have a PDI of about 1 to about 1.4.

Various homopolymers can be used. A homopolymer may be any previously known homopolymer typically used for conventional (UF) membrane fabrication. It may be desirable that a homopolymer have desirable solubility in solvents with high surface energy (such as, for example, NMP, DMF, DMSO, and the like) and undesirable solubility in solvents with low surface energy (such as, for example, THF, DOX, and the like).

Non-limiting examples of homopolymers include poly (sulfone)s, poly(propylene)s, poly(lactic acid)s, poly (sulfone)s, poly(ether sulfone)s, poly(phenyl sulfone)s, cellulose acetates, poly(acrylonitrile)s, poly(amide(s) (such as, for example, nylons and the like), and the like, and any combination thereof. Suitable homopolymers can made by methods known in the art and are commercially available.

A deposition solution can comprise various amounts of multiblock copolymer(s) and homopolymer(s). The polymer concentration of the casting solution can be, for example, about 5 percent by weight to about 50 percent by weight (e.g., about 5 percent by weight to about 20 percent by weight), including all integer values of percent by weight and ranges therebetween, based on the total weight of multiblock copolymer(s) and homopolymer(s) and solvents. A deposition solution can comprise various amounts of and/or ratios of multiblock copolymer(s). In various examples, a deposition solution comprises about 10 percent by weight or less by weight (e.g., about 0.1 percent by weight to about 10 percent by weight, including all 0.1 percent by weight by weight values and ranges therebetween) multiblock copolymer(s) (based on the total weight of multiblock copolymer(s) and homopolymer(s) in the deposition solution) and/or 90 percent by weight or more by weight (e.g., about 90 percent by weight to about 99.9 percent by weight, including all 0.1 percent by weight by weight values and ranges therebetween) homopolymer(s) (based on the total weight of multiblock copolymer(s) and homopolymer(s) in the deposition solution). In various examples, the ratio of multiblock copolymer(s) to homopolymer(s) ranges from about 1% to about 50% (e.g., about 1% to about 10% or about 2% to about 5%), including all 0.1 percent values and ranges therebetween. The homopolymer(s) may be the majority of the multiblock copolymer(s) and homopolymer(s) in the deposition solution.

A variety of solvents can be used in the deposition solution. A deposition solution comprises at least two solvents. At least one solvent has a lower surface energy and/or surface tension than the other solvent(s) and/or preferentially (relative to the other solvent(s)) solubilizes the multiblock copolymer(s) (e.g., the polymer chains of the multiblock copolymer micelle coronas) relative to the homopolymer(s). Examples of suitable solvents include, but are not limited to, tetrahydrofuran, 1,4-dioxane, morpholine, formylpiperidine, methanol, ethanol, toluene, chloroform, dimethylformamide, acetone, dimethylsulfoxide, dimethylacetamide, N-methylpyrrolidone, sulfolane, and the like, and any combination thereof. In various examples, the at least one solvent is 1,4-dioxane or THF and the other solvent is N-methylpyrrolidone (NMP).

In various examples, a deposition solution comprises at least two solvents (a lower surface energy solvent and a higher surface energy solvent) where the difference in surface energy between the lower surface energy solvent and higher surface energy solvent is at least about 2 mJ/m$^2$ or more, at least about 3 mJ/m$^2$ or more, at least about 4 mJ/m$^2$, or at least about 5 mJ/m$^2$ or more, or about 2 mJ/m$^2$ to about 25 mJ/m$^2$ (e.g., about 3 mJ/m$^2$ to about 10 mJ/m$^2$, about 5 mJ/m$^2$ to about 10 mJ/m$^2$), including all 0.1 mJ/m$^2$ values and ranges therebetween. In various examples, a deposition solution comprises at least two solvents where a first solvent (which may be a lower surface energy solvent) has a $\chi_{solvent-polymer}$ interaction parameter value for the multiblock copolymer(s) that is 60% or less (e.g., 50% or less, 40% or less, or 30% or less) of the $\chi_{solvent-polymer}$ interaction parameter value of the second solvent (which may be a higher surface energy solvent) and/or where a second solvent (which may be a higher surface energy solvent) has a $\chi_{solvent-polymer}$ for the homopolymer(s) that is 60% or less (e.g., 50% or less, 40% or less, or 30% or less) of the $\chi_{solvent-polymer}$ value of the value of the first solvent (which may be a lower surface energy solvent) for the homopolymer(s).

It may be desirable that the deposition solvent comprises at least 1,4-dioxane. In this case, the deposition solution also comprises an additional solvent or solvents. In various examples, the solvent system comprises 1,4-dioxane and at least one other solvent. In various examples, the solvent system comprises at least 33 percent by weight or at least 50 percent by weight 1,4-dioxane (based on the total weight of the solvents). For example, a solvent system with 70/30 1,4-dioxane/tetrahydrofuran by weight can be used. Without intending to be bound by any particular theory, it is considered that use of 1,4-dioxane in a deposition solution can result in the desired self-assembled morphology of the surface layer of the film upon evaporation. Examples of suitable solvents that can be used in combination with 1,4-dioxane include the aforementioned examples of suitable solvents and combinations thereof.

A deposition solution may comprise one or more metal salt(s). The metal salt(s) may be added after dissolution of the block copolymer(s) in the solvent (e.g., the first solvent system). It is desirable that the metal salt(s) be soluble in the solvents (e.g., organic polar solvents and the like). Without intending to be bound by any particular theory, it is considered that the metal salt(s) hold the core of the micelle together via electrostatic interactions with the core block so that when mixed together with the homopolymer solution which is formed separately, the micelles do not dissolve.

Figure 2:
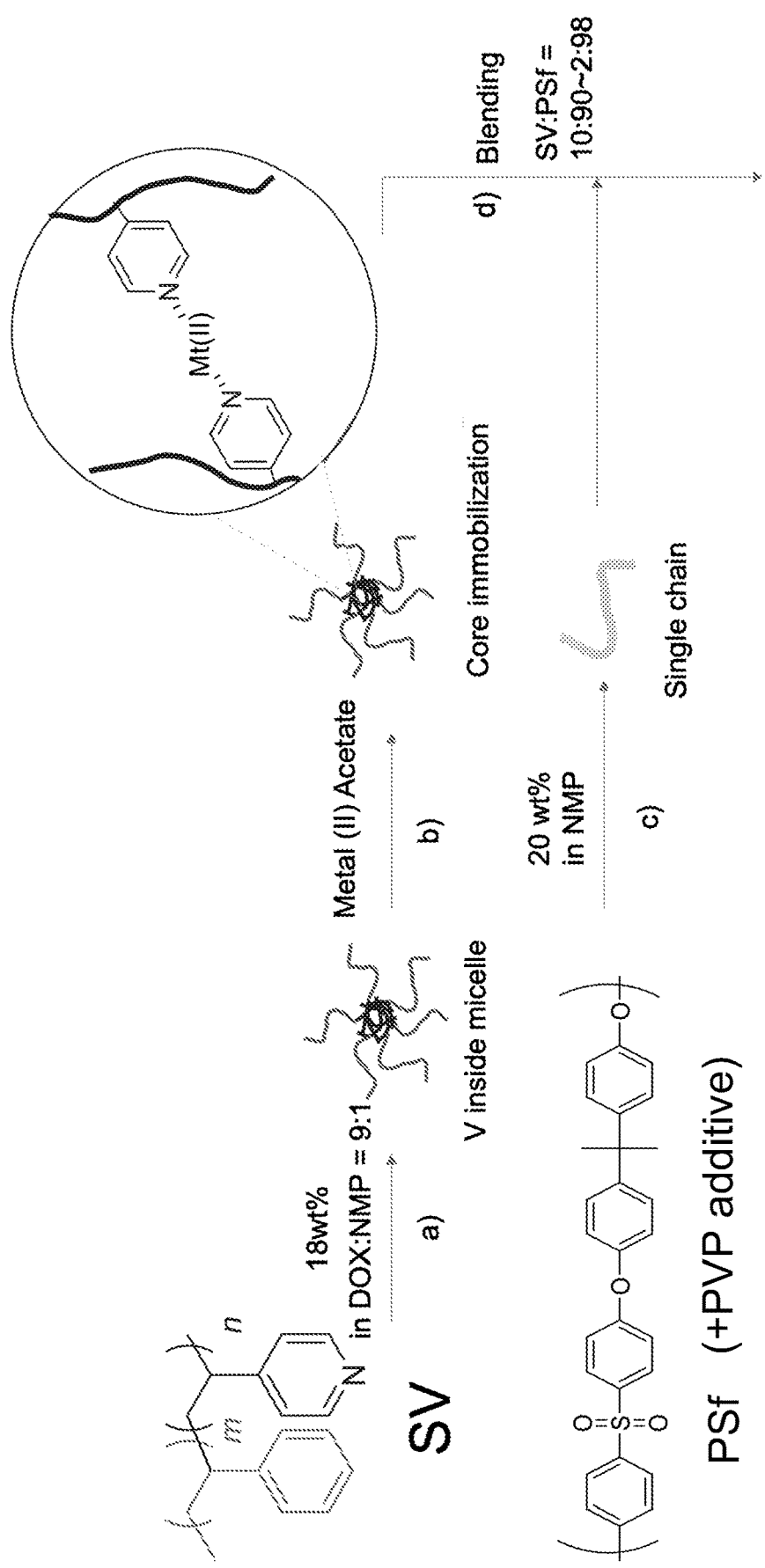
FIG. 2 shows a one step $^S$NIPS process toward a bilayer membrane composed of an SV BCP self-assembly based porous surface separation layer on top of an asymmetric PSf substructure casted from blend solutions. Reaction (a): V-core and S-shell core-shell micelle formation in 1:9 NMP:DOX. Reaction (b): Core immobilization by Cu (II) or Zn (II) acetate. Reaction (c): Dissolving PSf in NMP with PVP as additive (PSf:PVP=3:1). Reaction (d): Blending SV and PSf solutions at specific mixing ratios (SV:PSf between 10:90 and 2:98). Reaction (e): Blade casting and solvent evaporation for 40 s (s=second(s)). During this process, SV micelles come up to the surface and self-assemble to cover the PSf. Reaction (f): Precipitation/phase inversion of the casted solution in iced water yields the bilayer membrane of with SV BCP self-assembly based surface pore structure and asymmetric PSf pore substructure.
Figure 2:
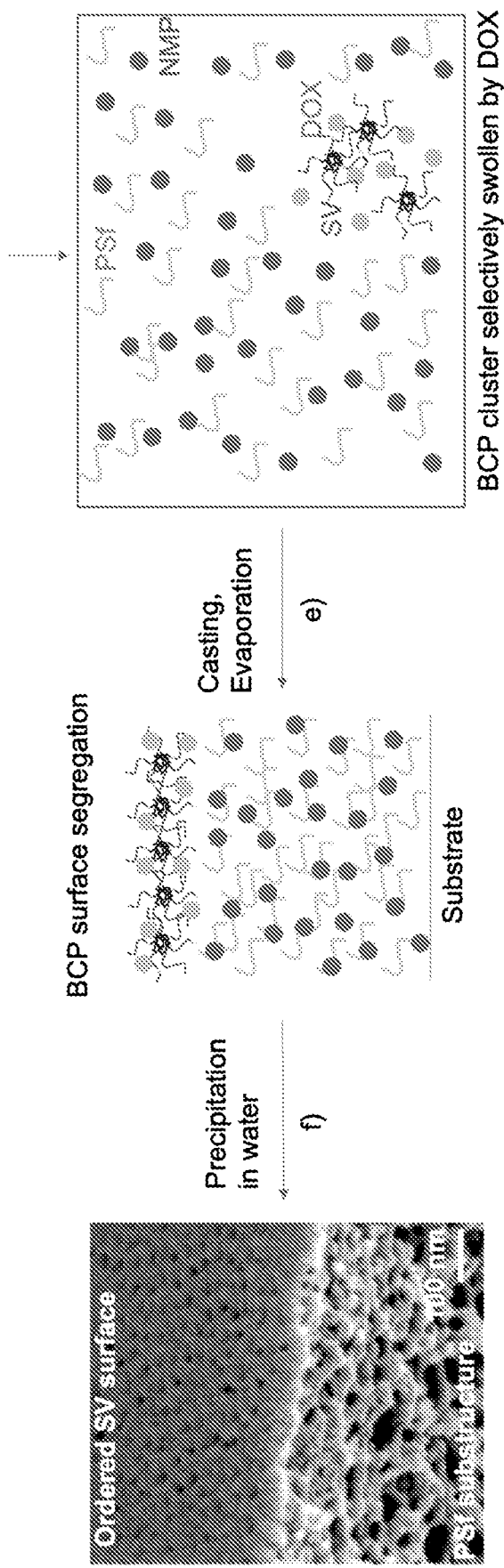
Figure 3A:
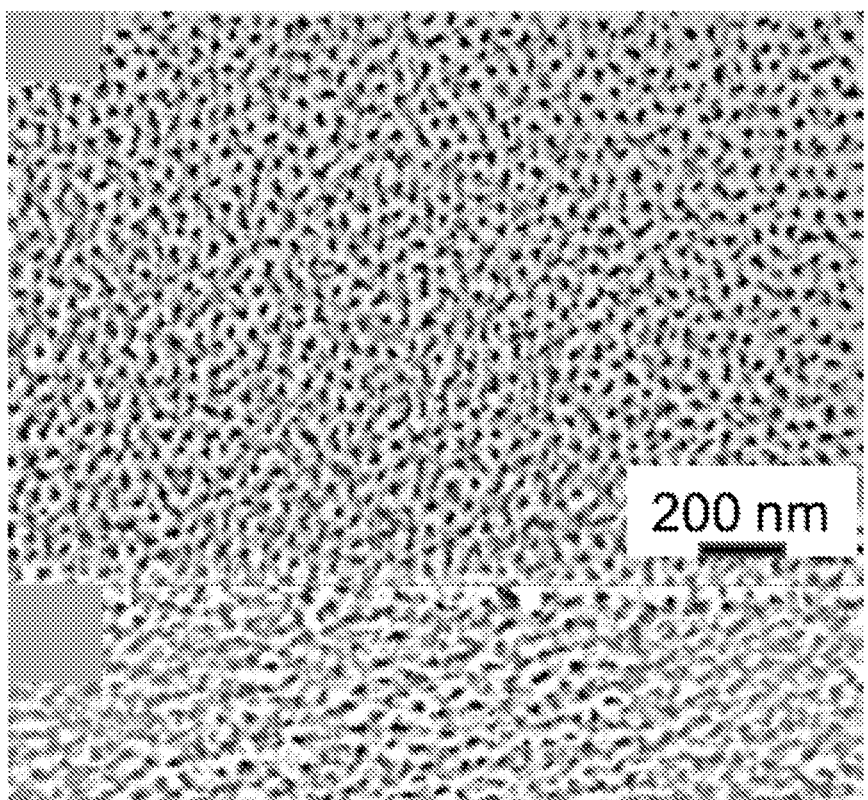
FIGS. 3A-3D show SEM images (FIGS. 3A-3C) and 1D Fast Fourier Transform (FFT) profiles (FIG. 3D) of surfaces of $^S$NIPS derived SV:(PSf+PVP) binary membranes at mixing ratio of 10:90 with additive of Cu (II) acetate (FIG. 3A), Zn(II) acetate (FIG. 3B), or no additive (FIG. 3C). All membranes were casted from DOX:NMP and precipitated in a water bath after 40 s evaporation time.
Figure 3B:
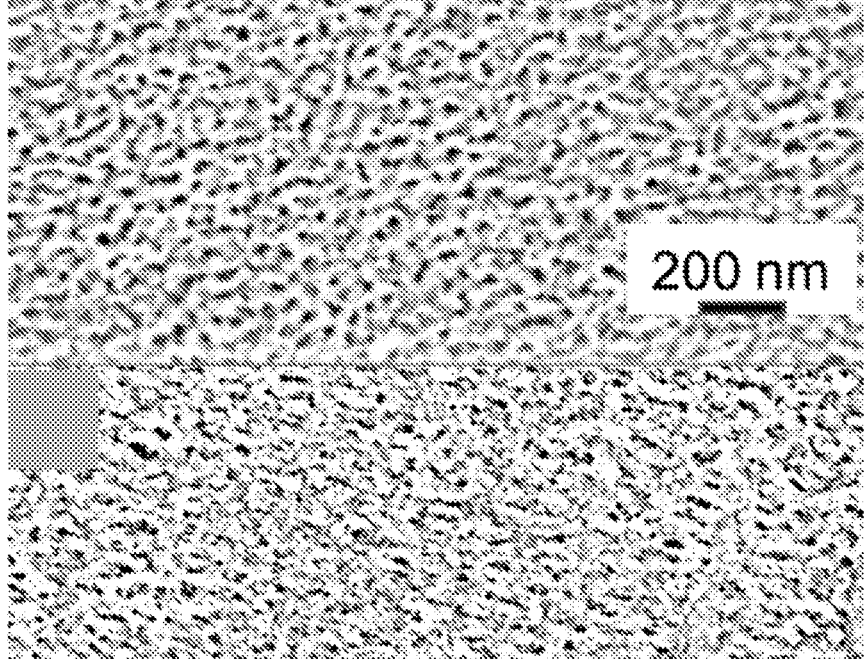
Figure 3C:
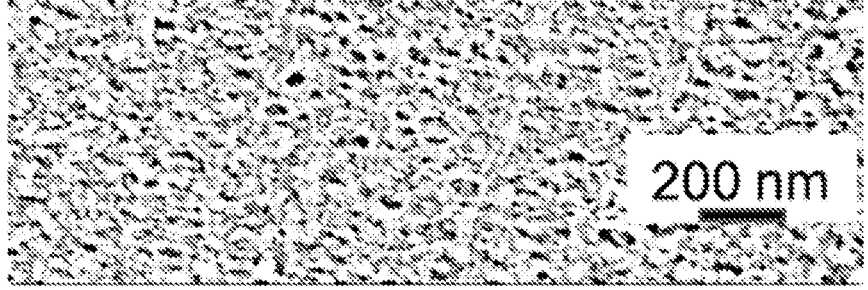
Figure 3D:
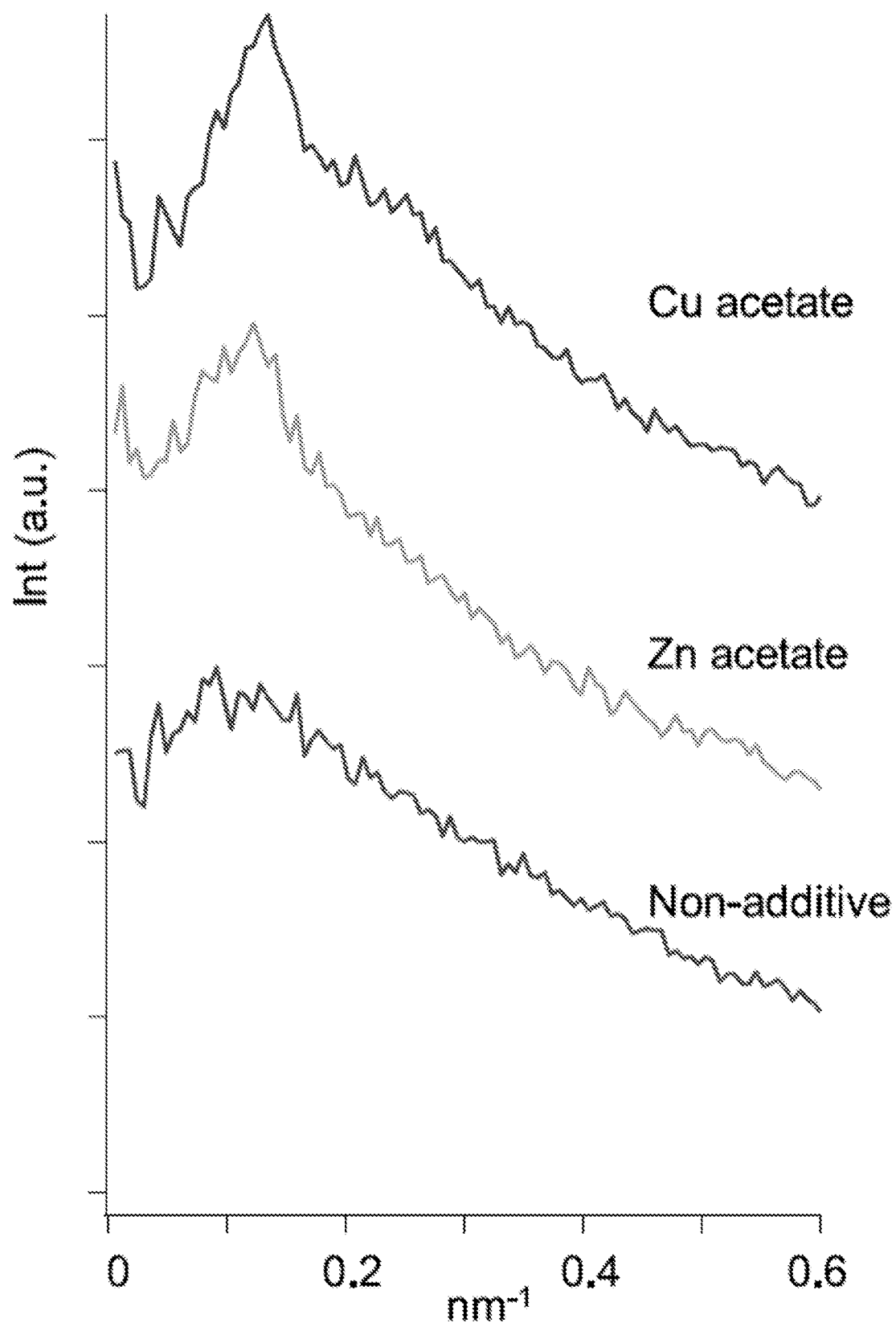

In various examples, the metal salt(s) is/are bivalent metal salt(s). In various examples, the metal salt(s) is/are carboxylate(s) or the like. In various examples, the metal salt(s) comprise (or are) M$^{2+}$ (acetate)$_2$ salts (such as, for example, Cu(acetate)$_2$, Zn(acetate)$_2$, Fe(acetate)$_2$ and Ni(acetate)$_2$, and the like, and combinations thereof). In various examples, the total metal salt content in the deposition solution is about 0.1 percent by weight to about 3 percent by weight of the block copolymer(s). In various examples, the total metal salt content in the deposition solution is about 0.1 percent by weight to about 3 percent by weight based on the total weight of the salt(s) and the block copolymer(s) weight. Without intending to be bound by any particular theory, it is considered that bivalent salts allow the metal cation to ligate with, for example, two separate functional groups on the core block of the micelle (e.g., a poly(vinyl pyridine), as shown in FIG. 2 in the inset between b and c).

A film can be formed without using metal salt(s). In various examples, the deposition solution does not comprise a metal salt. In various examples, a film does not comprise a metal salt.

In various examples, a deposition solution further comprises inorganic nanoparticles. Combinations of different (e.g., compositionally different, structurally different, different in size, or the like, or a combination thereof) nanoparticles may be used. A variety of inorganic nanoparticles can be used. In various examples, the inorganic nanoparticles are present in the deposition solution at about 0.1 percent by weight to about 50 percent by weight (the total weight of the solution), including all 0.1 percent by weight values and ranges therebetween. In various examples, the deposition solution has about 0.1 percent by weight to about 5 percent by weight or about 10 percent by weight to about 25 percent by weight inorganic nanoparticles. There is a correlation between the amount of inorganic nanoparticles in the deposition solutions and the amount of inorganic nanoparticles in the film formed from the deposition solution. In various examples, substantially all of the inorganic nanoparticles in the deposition solution are in the film formed from the deposition solution. By substantially all the inorganic nanoparticles it is meant that at least about 60, at least about 70, at least about 80, at least about 90 percent or at least about 95 percent of the inorganic nanoparticles in the deposition solution are in the film formed from the deposition solution. The nanoparticles may be amorphous or crystalline (e.g., have crystalline domains). The nanoparticles are spherical or non-spherical. Non-limiting examples of inorganic nanoparticles include metal oxide nanoparticles (e.g., doped metal oxide nanoparticles), metal nanoparticles (e.g., metal alloy nanoparticles having two or more metals), and the like and any combination thereof. No-limiting examples of metal oxide nanoparticles include titanium dioxide, niobium dioxide, iron oxide nanoparticles, and the like, and any combination thereof. Non-limiting examples of metal nanoparticles include silver nanoparticles, gold nanoparticles, platinum nanoparticles, and the like, and any combination thereof. Other non-limiting examples of inorganic nanoparticles include silica nanoparticles, aluminosilicate nanoparticles, transition metal nanoparticles, transition metal oxide nanoparticles, and the like any combination thereof Suitable nanoparticles can be made using methods known in the art (e.g., sol-gel methods and the like) or can be obtained commercially.

It may be desirable that the inorganic nanoparticles have a hydrophilic surface. The nanoparticles may be synthesized such that they have a hydrophilic surface or subject to post-synthesis treatment to provide nanoparticles with a hydrophilic surface. For example, the nanoparticles are a metal oxide (e.g., titanium dioxide or the like) with surface hydroxyl groups providing a hydrophilic surface.

Inorganic nanoparticles having a size of about 100 nm or less can be used. For a spherical nanoparticle, the size is the diameter of the nanoparticle. For a non-spherical nanoparticle, the size is the equivalent circular nanoparticle diameter. In various examples, the inorganic nanoparticles have a diameter or equivalent circular diameter of 1 nm to about 20 nm, including all values to the nm and ranges therebetween. In various examples, the inorganic nanoparticles have a diameter or equivalent circular diameter of about 1 nm to about 5 nm or about 1 to about 10 nm.

In various examples, the methods produce films where the films comprise multiblock copolymer(s) and homopolymer(s) and, optionally, one or more additive(s). In various examples, a film is a blend (e.g., a blend of multiblock copolymer(s), homopolymer(s), and additive(s). A deposition solution may further comprise one or more additive(s). Non-limiting examples of additives(s) include additive homopolymer(s), small molecule(s), and the like, and combinations thereof). Non-limiting examples of suitable additive homopolymers and small molecules are provided herein.

An additive may be a porogen(s) (e.g., PVP is added to polysulfone (PSf) as a porogen). It may be desirable that the additive(s) (e.g., porogen(s) and the like) is/are water soluble. Any water-soluble polymers miscible with the homopolymer(s) (e.g., PSf and the like) may be additives. Without intending to be bound by any particular theory, it is considered after the initial film formation, when the film is contacted with the phase separation solvent system (e.g., water or the like), the porogen (e.g., PVP or the like), if present, dissolves in the phase separation solvent system (e.g., water), resulting in a more porous substructure formed by the remaining homopolymer(s) (e.g., PSf or the like) than would have resulted if the porogen(s) were not used. In various examples, the additive(s) is/are PVP, PEG (poly (ethylene glycol), poly(meth)acrylic acid, or the like, or any combination thereof. The amount of additive(s) in the deposition solution may be about 1 percent by weight to about 40 percent by weight of the homopolymer(s) (e.g., PSf and the like), including all 0.1 percent by weight values and ranges therebetween. In the case where a deposition comprises one or more porogen(s), the film may comprise at least a portion of the porogen(s) or may not comprise the porogen(s).

A precursor film (which may be referred to, in the alternative, as an initial film, first film, or the like) is formed using a deposition solution. A precursor film can be deposited by a variety of methods known in the art. Examples of suitable deposition methods include, but are not limited to, doctor blade coating, dip coating, flow coating, slot coating, slide coating, inkjet printing, screen printing, gravure (flexographic) printing, spray-coating, knife coating, and the like. For example, when doctor blade coating is used, the gate height can be adjusted to the desired height depending on the concentration of the copolymer in the deposition solution. The doctor blade height can be set at, for example, from about 50 μm to about 500 μm.

At least a portion of the solvents in the solvent system is removed from the film after the film is formed from the deposition solution (initial film) prior to contacting the film with a phase separation solvent system. For example, from 1 percent by weight to 80 percent by weight (based on the total weight of the film), including all integer values of percent by weight and ranges therebetween, of the solvent(s) is/are removed. The amount of solvent in the film can be measured by techniques known in the art. For example, the amount of solvent in the film can be measured by infrared or UV/vis spectroscopy, or thermogravimetric analysis (TGA).

For example, at least a portion of the solvent(s) in the film is removed by allowing the as deposited film to stand for a period of time. The solvent removal (e.g., evaporation or the like) is a variable process and can take place over a wide range of times (e.g., from seconds to minutes). The time is dependent on, for example, the deposition solution composition. The solvent removal may include flowing a gas (e.g., air, nitrogen, or the like), exposing the film to reduced pressure, or the like. Such process may be used increase the rate of solvent removal.

After solvent removal, the film is contacted with a phase separation solvent system. The solvent system can be a single solvent or a mixture of solvents. The solvent system is a non-solvent for the multiblock copolymer(s) (i.e., at least one of the blocks of the multiblock copolymer precipitates in the solvent system). Further, in the case where 1,4-dioxane is used in the deposition solution, 1,4-dioxane must be miscible with the non-solvent. Examples of suitable solvents for use include, but are not limited to, solvents such as, for example, water, methanol, ethanol, acetone, and the like, and any combination thereof.

In various examples, the film is contacted with a vapor phase of the phase separation solvent system (i.e., a phase separation solvent system in the vapor phase). The vapor solvent system is a non-solvent for the multiblock copolymer(s) (i.e., at least one of the blocks of the multiblock copolymer precipitates in the solvent system). Examples of suitable solvent vapors for use include solvents such as, for example, water, methanol, ethanol, acetone, and the like, and any combination thereof.

Without intending to be bound by any particular theory, it is considered that contacting the film with a non-solvent in either the liquid phase or vapor phase causes at least one of the blocks in the multiblock copolymer(s) to precipitate. The structure of the film is therefore locked in due to vitrification of the polymer.

The films resulting from the method have an identifiable surface layer (also referred to herein as a separation layer) and an identifiable support layer. In various examples, the surface layer and support layer form a continuous film. The surface layer of the film is away from the substrate and disposed on at least a portion of the support layer, and the support layer of the film is disposed on the substrate. The film can be removed from the substrate providing a free-standing film. An isoporous region/layer may be referred to as an isoporous surface region/layer or an isoporous surface separation region/layer). An asymmetric pore region/layer may be referred to as an asymmetric pore substructure or asymmetric pore bulk region/layer). In various examples, the isoporous region/layer and asymmetric pore region/layer are not independently (or separately) formed and/or not laminated together to form the film.

An isoporous region/layer may be a continuous exterior region/layer of the asymmetric film (e.g., disposed on all of an exterior surface of an asymmetric pore region/layer). A deposition solution may comprise sufficient multiblock copolymers to form a continuous multiblock copolymer exterior region/layer disposed on at least a portion of the support layer of the film.

In various examples, the asymmetric pore region/layer does not comprise about 10 percent by weight or more, about 5 percent by weight or more, about 1 percent by weight or more, about 0.5 percent by weight or more multiblock copolymer(s) (based on the total weight of multiblock copolymer(s) and homopolymer(s) in the asymmetric pore region/layer). The amount of multiblock copolymer in the asymmetric pore region/layer may be determined by methods known in the art, such as, for example, energy dispersive x-ray analysis (EDX) or a chromatographic method, such as, for example, gel permeation chromatography (GPC) (e.g., GPC analysis of a dissolved asymmetric pore region/layer).

A film may be a dense film or a porous film. In various examples, the film structure is dense or porous. Without intending to be bound by any particular theory, it is considered that the film structure is determined by whether the wet film casted from deposition solution is quickly immersed into water bath or not. In various examples, the film has a thickness of from about 5 microns to about 500 microns. In various examples, the pore size (e.g., diameter or the like) in the surface separation layer is about 5 nm to about 50 nm (e.g., about 10 nm to about 50 nm) with about 4 nm standard deviation.

The components can be combined in any order. In various examples, a solution of the multiblock copolymer(s) in the lower surface tension solvent (which results in formation of polymer micelles) is formed independently and at least a portion of, substantially all, or all of the polymer micelles are present in the deposition solution. As an illustrative example, a polymer solution comprising the at least one solvent and multiblock copolymer(s) (e.g., first solvent or second solvent) is combined with a polymer solution comprising the other solvent(s) and homopolymer(s).

In an aspect, the present disclosure provides compositions. A composition may be a deposition solution, which may be used in a method of the present disclosure. In various examples, a composition comprises the components of a deposition solution of the present disclosure. Non-limiting examples of compositions are provided herein.

In various examples, a composition comprises at least two solvents, one or more multiblock copolymer(s), and one or more homopolymer(s). In various examples, a composition further comprises one or more metal salt(s) and/or one or more additive(s) (e.g., porogen(s), additive homopolymer(s), small molecule(s), or the like, or any combination thereof). In various examples, the solvents, multiblock copolymer(s), homopolymer(s), metal salt(s), if present, additive(s), if present, are present in the deposition solution at an amount described herein.

In an aspect, the present disclosure provides films (which may be referred to, in the alternative, as a multiblock copolymer-homopolymer films, asymmetric films, as asymmetric organic films, hybrid films, bilayer films, or surface segregated films). In various examples, a film is a membrane (which may be an ultrafiltration (UF) membrane). A film comprises at least one multiblock copolymer and at least one homopolymer. In various examples, the individual multiblock copolymer(s) and homopolymer(s) are one of those described herein. In various examples, a film is disposed on a substrate or is a free-standing film. A film may be a dense film or a porous film. In various examples, the film structure is dense or porous. In various examples, a film is made by a method of the present disclosure. In various examples, the film has one or more feature(s) of a film made by a method of the present disclosure. Non-limiting examples of films are provided herein.

In various examples, a film comprises an isoporous region (e.g., an isoporous layer), which may be referred to, in the alternative, as a surface region/layer, and an asymmetric pore region (e.g., an asymmetric pore layer), which may be referred to, in the alternative, as a support region/layer asymmetric pore substructure, asymmetric pore bulk region/layer. The isoporous surface region/layer is disposed on at least a portion (or all) of an exterior surface of the asymmetric pore region/layer. The isoporous region/layer comprises one or more multiblock copolymer(s) and the asymmetric pore region/layer comprises one or more homopolymer(s). In various examples, the isoporous region/layer and asymmetric pore region/layer are not independently (or separately) formed and/or not laminated together to form the film. In various examples, an asymmetric pore region/layer does not have 10 percent by weight or more, 5 percent by weight or more, 1 percent by weight or more, 0.5 percent by weight or more multiblock copolymer(s) (based on the total weight of multiblock copolymer(s) and homopolymer(s) in the asymmetric pore region/layer) as described herein, and/or the isoporous region/layer and asymmetric pore region/layer are not independently (or separately) formed and/or not laminated together to form the film.

In various examples, the asymmetric pore region/layer does not have 10 percent by weight or more, 5 percent by weight or more, 1 percent by weight or more, 0.5 percent by weight or more multiblock copolymer(s) (based on the total weight of multiblock copolymer(s) and homopolymer(s) in the asymmetric pore region/layer). The amount of multiblock copolymer in the asymmetric pore region/layer may be determined by methods known in the art, such as, for example, energy dispersive x-ray analysis (EDX) or a chromatographic method, such as, for example, gel permeation chromatography (GPC) (e.g., GPC analysis of a dissolved asymmetric pore region/layer).

In various examples, at least one of the one or more multiblock copolymer(s) has a low Tg polymer block, a styrene block having a Mn of from $1\times10^3$ to $1\times10^6$ g/mol and a 4-vinyl pyridine block having a Mn of from $1\times10^3$ to $1\times10^6$ g/mol. In various examples, a multiblock copolymer comprises at least one high Tg block (e.g., a block having a higher Tg than one or more or all of the homopolymer(s)).

In various examples, a film is graded. By "graded" it is meant that the films have a support layer where the support layer has asymmetric porosity. For example, the pores increase in diameter or equivalent circular diameter through the depth of film moving from the exposed surface of the surface layer through the surface layer and support layer to the substrate or, in the case of a free-standing film, the exposed surface of the support layer. In various examples, the support layer is graded. In another embodiment, the surface layer and support layer are graded. Graded asymmetric organic-inorganic film can be made by the methods disclosed herein.

A film can have a variety of shapes. One having skill in the art will appreciate that films having a variety of shapes can be fabricated. The films can have a broad range of sizes (e.g., film thicknesses and film area). For example, a film has a thickness of about 5 microns to about 500 microns, including all values to the micron and ranges therebetween. Depending on the application (e.g., bench-top applications, biopharmaceutical applications, and separation applications (e.g., water purification applications), a film can have an area ranging from about 10 s of cm$^2$ to about 10 s (even 100 s) of m$^2$.

A film can have desirable properties. For example, a film has one or more desirable mechanical propert(ies) and/or permeability. The mechanical properties of a film can be tailored by use of selected multiblock copolymers. For example, depending on the multiblock copolymer used and structure of the film, a film exhibits a hydraulic permeability of at least about 1000 L m$^{-2}$ hr$^{-1}$ bar$^{-1}$.

The structural and performance characteristics of a film may include both stimuli responsive permeation and separation. A film can be tuned in a manner so that transport of various liquids and solids can be controlled. In various example, the pore size of a film can be turned (e.g., increased or decreased) by incorporating homopolymer additive(s), small molecule(s), porogen(s), or the like, or a combination thereof, in the deposition solution, by exposing the film to a specific pH solution (e.g., the film is exposed a feed solution having a desired pH after the formation process), or the like, or a combination thereof.

A film can have various thicknesses. In various examples, the film has a thickness of from about 5 microns to about 500 microns, including all 0.1 micron values and ranges therebetween.

A film has a surface layer (also referred to herein as a top layer or separation layer) and a support layer. The surface layer can have a range of thicknesses. For example, the surface layer has a thickness of about 20 nm to about 500 nm, including all values to the nm and ranges therebetween. The surface layer comprises a plurality of pores extending thorough the depth of the surface layer. The pores can have morphologies such as, for example, cylindrical morphologies, cubic morphologies, gyroid morphologies, networked morphologies, and the like. In various examples, the pores have a size of about 5 nm to about 100 nm, including all values to the nm and ranges therebetween. For a spherical pore, the size is the diameter of the pore. For a non-spherical pore, the size of the surface layer pore is the equivalent circular diameter of the pore (i.e., the equivalent circular surface layer pore diameter). The surface layer can have a range of pore densities. For example, the surface layer pore density can be from about 1×10$^{14}$ pores/m$^2$ to about 1×10$^{15}$ pores/m$^2$, including all values to the 10 pores/m$^2$ and ranges therebetween. In various examples, the density of the surface pores of a film as described herein is at least 10$^{14}$ pores/m$^2$. The surface layer is isoporous. By "isoporous" it is meant that the pores have narrow pore size distribution. For example, a narrow pore size distribution (defined as the ratio of the maximum pore diameter to the minimum pore diameter ($d_{max}/d_{min}$)) can be from about 1 to about 3, including all values to 0.1 and ranges therebetween. In various examples, ($d_{max}/d_{min}$) is about 1, about 1.5, about 2, about 2.5, or about 3. For example, a film comprises a surface layer having nearly monodisperse mesopores. In various examples, the isoporous surface layer has a pore density of at least 1×10$^{14}$ pores/m$^2$ and a pore size distribution ($d_{max}/d_{min}$) of less than 3. The pores in the surface layer are interconnected. In various examples, the pores in the surface layer form an interconnected network.

Without intending to be bound by any particular theory, it is considered that the morphology of the surface layer is, at least in part, a result of the self-assembly of the block copolymer. The morphology of this layer is dependent on casting conditions (e.g., flow rate of environment around the film, water (humidity)/solvent concentration in environment around the film, evaporation time, casting speed, gate height, or the like, or a combination thereof), composition of the casting solvent (e.g., polymer molecular weights, chemistry, concentration, casting solvent, mixture of solvents, or the like, or any combination thereof), or the like, or any combination thereof.

The support layer is disposed between the surface layer and the substrate in cases where the film is disposed on the substrate. This layer is a supporting sub-structure layer.

The support layer can have a range of thicknesses. For example, the thickness of the support layer can be from 5 microns to 500 microns, including all values to the micron and ranges therebetween. The pores in the support layer can be from 10 nm to 100 microns in size, including all values to the nm and ranges therebetween. For a spherical support layer pore, the size is the diameter of the pore. For a non-spherical support layer pore, the size is the equivalent circular diameter of the pore (i.e., the equivalent circular support layer pore diameter). The pores in the support layer are interconnected. In various examples, the pores in the support layer form an interconnected network. In various examples, the pores in the surface layer and support layer are interconnected and form a continuous network.

The support layer may have a graded structure. In this case, moving from the top of this layer (e.g., the surface in contact with the surface layer) to the bottom of the layer (e.g., the free surface or surface in contact with the substrate), the pores increase in size. For example, the support layer can have pores having a size of about 10 nm at the top of the support layer (layer in contact with the surface layer) and the pores increase in size to about 100 μm at the bottom of the support layer. The increase in pore size moving though the depth of the film (e.g., from the surface of the support film in contact with the surface layer to the surface of the film in contact with the substrate) provides an asymmetric structure. This support layer may be formed as a result of contacting (e.g., immersing) the film into a non-solvent bath.

In various examples, the film comprises a multiblock copolymer having at least two blocks that microphase separate, and, optionally, a plurality of inorganic nanoparticles disposed within at least a portion of the film and on at least a portion of the film surface. In these examples, the film has a surface layer having a thickness of about 20 nm to about 500 nm and a plurality of pores having a diameter of about 5 nm to about 100 nm in size and a support layer having a thickness of about 5 microns to about 500 microns and pores having a diameter or equivalent circular diameter of about 1 micron to about 50 microns.

A film may also comprise one or more metal salt(s), one or more inorganic nanoparticles, one or more additive(s), or the like, or any combination thereof. The amount of these film components depends on the amount of metal salt(s), if present, inorganic nanoparticle(s), if present, additive(s), if present, in the deposition solution used to make the film.

The amount of inorganic nanoparticles in the deposition solution can provide films with different support layer structure (e.g., different pore morphology). Based on the amount of inorganic nanoparticles in the deposition, the resulting film can have, for example, "sponge-like" morphology or "finger-like" morphology. For example, in some cases, use of a deposition solution with less than 3 percent by weight inorganic nanoparticles provides films with a "sponge-like" morphology. In another example, in some cases, use of a deposition solution with 3 percent by weight or greater inorganic nanoparticles provides films with a "finger-like" morphology.

In various examples, the support layer has a "sponge-like" structure. The pores in the "sponge-like" structure have diameter or equivalent circular support layer pore diameter of about 10 nm to about 5,000 nm, including all integer nm values and ranges therebetween, and have an aspect ratio of less than about 2. In this embodiment, the pores may be graded.

In various examples, the support layer has a "finger-like" structure. The pores in the "finger-like" structure have a diameter or equivalent circular support layer pore diameter of about 1,000 nm to about 500,000 nm, including all integer nm values and ranges therebetween, and have an aspect ratio of 2 or more. For example, in the "finger-like" structure embodiment, a plurality of the pores in the support layer lie on a plane that is about 20 microns from the surface layer and substantially parallel to the surface-layer-support-layer interface of the film have a diameter or equivalent circular support layer pore diameter in the plane (i.e., cross-sectional diameter or equivalent circular support layer pore diameter) of at least 5 microns. By "substantially" it is meant that the angle formed by the cross-sectional diameter or equivalent circular support layer pore diameter dimension of the pores and surface-layer-support-layer interface is +/− about 10 degrees from about 90 degrees. In various examples, that the angle formed by the cross-sectional diameter or equivalent circular support layer pore diameter dimension of the pores and surface-layer-support-layer interface is +/− about 5 degrees, about 4 degrees, about 3 degrees, about 2 degrees, or about 1 degree from about 90 degrees. In various examples, a plurality of the pores in the support layer lying on a plane about 5, about 10, or about 40 microns from the surface layer and parallel to the surface-layer-support-layer interface of the film have a diameter or equivalent circular support layer pore diameter in the plane of at least about 1, about 2.5, or about 10 microns, respectively. In this embodiment, the pores may be graded.

In various examples, in "finger-like" structure examples, at least a portion of the pores in the support layer have an aspect ratio of greater than about 2. "Aspect ratio" as used herein means the ratio of length of the pore along the axis perpendicular to the surface-layer-support layer interface to the longest length of a cross-section of the pore parallel to the surface-layer-support layer interface. In various examples, at least a portion of the pores in the support layer have an aspect ratio of greater than about 3, greater than about 4, or greater than about 5.

In the "finger-like" structure examples, the support layer has a hierarchical structure. What is meant by hierarchical is that the pores in the support layer are mesoporous. In various examples, at least a portion of the pore surface (e.g., pore walls) is mesoporous. For example, at least a portion of the pore surface (e.g., pore walls) in the support layer has pores with a diameter or equivalent circular diameter of about 2 nm to about 50 nm, including all integer nm values and ranges therebetween.

In various examples, a film has inorganic nanoparticles disposed within and on the surface of the film. For example, the inorganic nanoparticles are present in the polymer matrix of the film (e.g., throughout the separation and support layers) and on the surface of the film (including the pore surface). Some portion of the nanoparticles is present within the film (i.e., completely encapsulated by the polymer matrix of the film) and some portion of the nanoparticles is present on the surface. In various examples, the inorganic nanoparticles are not present solely on a surface of the film. The film has about 0.1 percent by weight to about 50 percent by weight, including all integer percent by weight values and ranges therebetween, inorganic nanoparticles. In various examples, the film has about 0.1 percent by weight to about 5 percent by weight or about 10 percent by weight to about 25 percent by weight inorganic nanoparticles.

For example, the film further comprises a plurality of metal nanoparticles. The metal nanoparticles inorganic are disposed on at least a portion of the film (e.g., the top, self-assembled surface layer surface, pore surface of the surface layer, and pore surface of the graded substructure). The nanoparticles can complex (e.g., through weak intramolecular forces) with the multiblock copolymer of the film surface or form on the original inorganic nanoparticles from the deposition solution. Examples of suitable metals for the metal nanoparticles include gold, silver, platinum, palladium, cobalt, copper, nickel, iron, zinc, chromium, ruthenium, titanium, zirconium, molybdenum, aluminum, and cadmium. The nanoparticles can be mixtures of different nanoparticles. Films with silver nanoparticles can exhibit antimicrobial behavior. For example, the inorganic material can be disposed on at least 50 percent, at least 60 percent, at least 70 percent, at least 80 percent, at least 90 percent, at least 95 percent, at least 99 percent of the surfaces of the film. In an example, the inorganic material is disposed on 100 percent of the surfaces of the film.

In various examples, a film further comprises an inorganic material disposed on at least a portion of a surface of the film. This inorganic material is the same or different than the aforementioned inorganic nanoparticles. This inorganic material is added to the film after the film is formed (i.e., it is post-film formation inorganic material). The inorganic material is disposed on at least a portion of the film (e.g., the top, self-assembled surface layer surface, pore surface of the surface layer, and pore surface of the graded substructure). For example, the inorganic material can be in the form of nanoparticles. The nanoparticles can be, for example, about 1 to about 200 nm, including all values to the nanometer and ranges therebetween, in diameter. Examples of suitable inorganic materials include, but are not limited to, metals, metal oxides (e.g., silver oxide and copper oxide), semiconductors (e.g., semiconducting nanoparticles such as CdS nanoparticles), and the like, and combinations thereof.

The inorganic materials can be deposited on the film by methods known in the art. For example, the inorganic material can be deposited by electroless deposition methods.

A film may comprise at least one homopolymer additive and/or at least one small molecule additive. In various examples, a film further comprises additive homopolymer(s) and/or small molecule(s). In various examples, the additive homopolymer(s) and/or small molecule(s) is/are blended in the multiblock copolymer(s). For example, the additive homopolymer(s) and/or small molecule(s) is/are blended in (i.e., mixed with) the hydrogen-bonding block or hydrophobic block of a multiblock copolymer. The additive homopolymer and/or small molecule may preferentially associate with one of the blocks of a multiblock copolymer and locate in the vicinity of that block. As illustrative examples, a poly(phenylene oxide) mixes with a poly(styrene) block of a multiblock copolymer and a poly(butadiene) mixes with a poly(isoprene) block of a multiblock copolymer. Such films can be prepared as described herein.

A film can comprise a variety of additive homopolymers. For example, any homopolymer that has the same chemical composition as or can hydrogen bond to at least one block (e.g., the hydrogen-bonding block) of the multiblock copolymer can be used. By same chemical composition it is meant that in an A-B type diblock copolymer the homopolymer is chemically composed of A (or B). The homopolymer may have hydrogen bond donors or hydrogen bond acceptors. Non-limiting examples of suitable homopolymers include poly((4-vinyl)pyridine), poly(acrylic acid), poly(hydroxy styrene), and the like, and any combination thereof. In cases where the multiblock copolymer has a hydrogen-bonding block, it is desirable that the additive homopolymers or small molecules have a low or negative chi parameter with the hydrogen-bonding block (e.g., poly((4-vinyl) pyridine)). A range of ratios of multiblock copolymer(s) to additive homopolymer(s) can be used. For example, the molar ratio of multiblock copolymer(s) to homopolymer(s) can be from 1:0.05 to 1:10, including all ranges therebetween. The homopolymer can have a range of molecular weight. For example, the homopolymer can have a molecular weight of $5 \times 10^2$ g/mol to $5 \times 10^4$ g/mol.

A film can comprise a variety of small molecules. For example, any small molecule that can hydrogen bond to at least one block of the multiblock copolymer can be used. The small molecule can have hydrogen bond donors or hydrogen bond acceptors. Non-limiting examples of suitable small molecules include pentadecyl phenol, dodecyl phenol, 2-4'-(hydroxybenzeneazo)benzoic acid (HABA), 1,8-naphthalene-dimethanol, 3-hydroxy-2-naphthoic acid, 6-hydroxy-2-naphthoic acid, and the like, and any combination thereof. A range of ratios of multiblock copolymer(s) to small molecule(s) can be used. For example, the molar ratio of multiblock copolymer(s) to small molecule can be from about 1:1 to about 1:1000, including all integer ratios therebetween.

In an aspect, the present disclosure provides uses of the films of the present disclosure. The films can be used in applications such as, for example, filtration applications (e.g., chemical/biological molecule separations, and water purification), drug delivery, molecular sensing, and the like. Non-limiting examples of uses of the films are provided herein.

Examples of filtration applications include, but are not limited to, concentration or purification of therapeutic proteins or other macromolecules, removal of water contaminants, use as an air filter, and the like. For example, a film or films can be used as filtration media in a filtration device (e.g., ultrafiltration device or the like) for concentration and/or purification of proteins, viruses, or other dissolved material, as a separation media for liquids, vapors (i.e., gas), or solutions, or the like. Pressure may be applied across the films (e.g., parallel or perpendicular to the film surface by pressurized air or centrifugal force) to facilitate flow of feed streams across or through the film. A film can also be used as a penetrable catalyst support substrate or the like.

In various examples, a method of filtration comprises contacting a film or films of the present disclosure with a mixture (e.g., a feed stream) comprising at least one material (e.g., nanoparticles, biological materials such as, for example, cellular debris, proteins, nucleic acids, viruses, or the like, or any combination thereof) that is to be separated from the mixture under conditions such that the at least one material is separated from the mixture. In various examples, pressure is applied across or through the film(s). In various examples, the mixture comprises a protein and a virus and the protein is separated from the virus.

In an aspect, the present disclosure provides devices comprising a film of the present disclosure. For example, the films can be used as filtration membranes in filtration devices (e.g., ultrafiltration devices) for concentration and/or purification or proteins, viruses, or other dissolved material, as a separation media for liquids, vapors (i.e., gas), solutions, or the like, or the like. The films may be used in normal flow or tangential or cross-flow configurations. The films may be encapsulated in housings to form devices. The housings are comprised of, for example, polypropylene or metal. In various examples, device is filtration device. In various examples, a filtration device is an ultrafiltration device. Examples of the devices are known in the art and the devices can be made using methods known in the art.

The multiblock copolymers/homopolymers offer a functional approach for designing a versatile assortment of mesoscale materials, such as patterned media, and devices, including batteries, solar cells, and fuel cells. In addition to applications in drug delivery and nanofluidics, the asymmetric multiblock copolymer films can be used as separation media.

The following Statements describe various examples of the present disclosure and are not intended to be in any way limiting:

Statement 1. A method for forming a film (which may be referred to as an asymmetric film) comprising an isoporous region (e.g., an isoporous layer), which may be a surface layer, and an asymmetric pore region (e.g., an asymmetric pore layer) (e.g., each layer/region has a different composition), where the isoporous surface region is disposed on at least a portion (or all) of an exterior surface of the asymmetric pore region, comprising: forming a first film (e.g., on a substrate) from a deposition solution (e.g., a dope) comprising one or more multiblock copolymer(s), one or more homopolymer(s), two or more solvents, and optionally, one or more metal salt(s), allowing the first film to stand for a period of time such that at least a portion of the two or more solvents is removed from the film (e.g., a gradient in the concentration of the solvents along an axis normal to the longest dimension of the first film is formed) and at least a portion of the multiblock copolymer migrates to an exterior surface of the first film (which may be referred to as surface segregation) (e.g., a top surface of the film) and a second film is formed; and contacting the second film with a phase separation solvent system, such that the film comprising an isoporous surface region and an asymmetric pore region (e.g., the asymmetric film) is formed.

Statement 2. A method according to Statement 1, where the one or more multiblock copolymer(s) comprise 10 percent by weight or less (e.g., 2 to 10 percent by weight) of the deposition solution (based on the total weight of multiblock copolymer(s) and homopolymer(s) present in the deposition solution) and/or the one or more homopolymer(s)

comprise 90 percent by weight or more (e.g., 90 to 98 percent by weight) of the deposition solution (based on the total weight of multiblock copolymer(s) and homopolymer(s) present in the deposition solution).

Statement 3. A method according to Statement 1 or Statement 2, where the at least two of the two or more solvent(s) have different surface energy and/or surface tension and/or the lower surface energy/tension solvent preferentially solubilizes the one or more block copolymer(s) relative to the homopolymer(s).

Statement 4. A method according to any one of the preceding Statements, where the method comprises: providing a first polymer solution comprising one or more first polymer(s) (e.g., one or more block copolymer(s) or one or more homopolymer(s)) and one or more first solvent(s), where the first polymer solution optionally further comprises a salt; providing a second polymer solution comprising one or more second polymer(s) (e.g., one or more homopolymer(s), if the first polymer(s) is/are block copolymer(s), or one or more block copolymer(s), if the first polymer(s) is/are homopolymer(s)) and one or more second solvent(s), where the second polymer solution optionally further comprises a salt, where the solvent of the polymer solution comprising the multiblock copolymer (e.g., first solvent or second solvent) has a lower surface energy and/or surface tension than the solvent of the polymer solution comprising the homopolymer(s) (e.g., first solvent or second solvent) and/or the solvent of the polymer solution comprising the multiblock copolymer preferentially solubilizes the multiblock copolymer(s) relative to the homopolymer(s).

Statement 5. A method according to any one of the preceding Statements, where the pores of the isoporous region/layer have a pore size distribution of less than 3, where the pore size distribution is the ratio of the maximum pore diameter ($d_{max}$) to the minimum pore diameter ($d_{min}$).

Statement 6. A method according to any one of the preceding Statements, where the isoporous region/layer has a thickness (e.g., a dimension normal to the longest linear dimension of the isoporous region/layer) of 20 nm to 500 nm, including all 0.1 nm values and ranges therebetween, and a plurality of pores having a size (e.g., a diameter or equivalent circular diameter) of 5 nm to 100 nm, including all 0.1 nm values and ranges therebetween, and the asymmetric pore region/layer has a thickness (e.g., a dimension normal to the longest linear dimension of the isoporous region/layer) of 5 microns to 500 microns, including all 0.1 nm values and ranges therebetween, and pores having a size (e.g., a diameter or equivalent circular diameter) of 10 nm to 50 microns, including all 0.1 nm values and ranges therebetween.

Statement 7. A method according to any one of the preceding Statements, where the isoporous region/layer comprises a plurality of the pores 5 nm to 100 nm in size (e.g., a diameter or equivalent circular diameter) and/or a pore density of at least $1 \times 10^{14}$ pores/$m^2$.

Statement 8. A method according to any one of the preceding Statements, where at least a portion of (or all) the pores of the asymmetric pore region/layer increases in size (e.g., a diameter or equivalent circular diameter) along a dimension of the asymmetric film moving away from a surface of the isoporous region/layer in contact with the asymmetric pore region/layer towards a surface of the asymmetric pore region/layer in contact with the substrate.

Statement 9. A method according to any one of the preceding Statements, where a plurality of the pores in the asymmetric pore region/layer lying on a plane 20 microns from the surface layer and parallel to interface between the isoporous region/layer and asymmetric pore region/layer have a size (e.g., diameter or equivalent circular diameter) in the plane of at least 5 microns.

Statement 10. A method according to any one of the preceding Statements, where at least a portion of the pores in the asymmetric pore region/layer have an aspect ratio of greater than 2.

Statement 11. A method according to any one of the preceding Statements, where at least a portion of the pore surface in the asymmetric pore region/layer is mesoporous.

Statement 12. A method according to any one of the preceding Statements, where the concentration of multiblock copolymer(s) and homopolymer(s) in the deposition solution is 5 to 30 percent by weight (based on the total weight of the deposition solution).

Statement 13. A method according to any one of the preceding Statements, where at least one multiblock copolymer or all of the multiblock copolymers comprises one or more hydrogen-bonding block(s) (e.g., hydrogen-bonding block(s) chosen from poly((4-vinyl)pyridine), poly((2-vinyl) pyridine), poly(ethylene oxide), poly(methacrylic acid), poly(acrylic acid), poly(dimethylethyl amino ethyl methacrylate), poly(hydroxystyrene), and the like, and combinations thereof).

Statement 14. A method according to any one of the preceding Statements, where at least one multiblock copolymer or all of the multiblock copolymers further comprises one or more low $T_g$ block(s) (e.g., low $T_g$ block(s) chosen from poly(isoprene), poly(butadiene), poly(butylene), poly (isobutylene), and the like, and combinations thereof).

Statement 15. A method according to any one of the preceding Statements, where the homopolymer is chosen from polysulfanes, polypropylenes, polylactic acids, polysulfones, poly(ether sulfone)s, poly(phenyl sulfone)s, cellulose acetates, poly(acrylonitrile)s, nylons and the like, and combinations thereof.

Statement 16. A method according to any one of the preceding Statements, where the deposition solution further comprises inorganic nanoparticles (e.g., inorganic nanoparticles present at 0.1 percent by weight to 50 percent by weight based on the total weight of multiblock copolymer(s), homopolymer(s), and inorganic nanoparticles in the deposition solution) and the asymmetric film further comprises inorganic nanoparticles.

Statement 17. A method according to any one of the preceding Statements, where the solvent(s) (e.g., first solvent(s) and/or second solvent(s)) comprise solvents chosen from 1,4-dioxane, tetrahydrofuran, methanol, ethanol, toluene, chloroform, dimethylformamide, acetone, dimethylsulfoxide, N-methyl pyrrolidone, and the like, and combinations thereof.

Statement 19. A method according to any one of the preceding Statements, where the deposition further comprises one or more small molecule(s) and the asymmetric film further comprises the one or more small molecule(s).

Statement 20. A method according to any one of the preceding Statements, further comprising depositing one or more inorganic materials on at least a portion of a surface of the asymmetric film.

Statement 21. A method according to Statement 20, where the inorganic material is a plurality of metal nanoparticles, where the metal nanoparticles comprise one or more metal(s).

Statement 22. A method according to any one of the preceding Statements, further comprising separating the asymmetric film from the substrate to form a free-standing asymmetric film.

Statement 23. A method according to any one of the preceding Statements, where the one or more multiblock copolymer is polystyrene-b-poly(4-vinylpyridine), the one or more homopolymer(s) is polysulfone or poly(ether sulfone), and the solvents may be 1,4-dioxane or THF (e.g., first solvent) and N-methylpyrrolidone (NMP) (e.g., second solvent), the one or more multiblock copolymer is polystyrene-b-poly(acrylic acid), the one or more homopolymer(s) is poly(ether sulfone), and the solvents may be 1,4-dioxane or THF (e.g., first solvent) and N-methyl pyrrolidone (e.g., second solvent), the one or more multiblock copolymer is polyisoprene-b-polystyrene-b-poly(4-vinylpyridine), the one or more homopolymer(s) is poly(ether sulfone), and the solvents may be 1,4-dioxane or THF (e.g., first solvent) and N-methyl pyrrolidone (e.g., second solvent), the one or more multiblock copolymer is polystyrene-b-poly(ethylene oxide), the one or more homopolymer(s) is poly(ether sulfone), and the solvents may be 1,4-dioxane or THF (e.g., first solvent) and N-methyl pyrrolidone (e.g., second solvent), the one or more multiblock copolymer is polystyrene-b-P4VP, the one or more homopolymer(s) is poly(ether sulfone), and the solvents may be 1,4-dioxane or THF (e.g., first solvent) and N-methyl pyrrolidone (e.g., second solvent), the one or more multiblock copolymer is polystyrene, the one or more homopolymer(s) is polysulfone, and the solvents may be 1,4-dioxane or THF (e.g., first solvent) and N-methyl pyrrolidone (e.g., second solvent), the one or more multiblock copolymer is polyisoprene-b-polystyrene-b-P4VP, the one or more homopolymer(s) is polysulfane or poly(ether sulfone), and the solvents may be 1,4-dioxane or THF (e.g., first solvent) and N-methyl pyrrolidone (e.g., second solvent), or the one or more multiblock copolymer is polystyrene-b-polyethylene oxide, the one or more homopolymer(s) is polysulfane or poly(ether sulfone), and the solvents may be 1,4-dioxane or THF (e.g., first solvent) and N-methyl pyrrolidone (e.g., second solvent).

Statement 24. A film (which may be referred to as an asymmetric film) made by a method of the present disclosure (e.g., a method of any one of the preceding Statements).

Statement 25. A film (which may be referred to as an asymmetric film) comprising an isoporous region (e.g., an isoporous layer) and an asymmetric pore region (e.g., an asymmetric pore layer), where the isoporous surface region is disposed on at least a portion (or all) of an exterior surface of the asymmetric pore region, where the isoporous layer comprises one or more multiblock copolymer(s) and the asymmetric pore region comprises one or more homopolymer(s), and i) the asymmetric pore region/layer does not have 10 percent by weight or more, percent by weight or more, 1 percent by weight or more, 0.5 percent by weight by weight or more multiblock copolymer(s) (based on the total weight of multiblock copolymer(s) and homopolymer(s) in the asymmetric pore region/layer as described herein, and/or ii) the isoporous region/layer and asymmetric pore region/layer are not independently (or separately) formed and/or not laminated together to form the asymmetric film.

Statement 26. A device comprising one or more films of the present disclosure (e.g., one or more film(s) made by a method of the present disclosure, such as, for example, a method of any one of Statements 1-23, and/or one or more film(s) of the present disclosure, such as, for example, one or more film(s) of Statement 24 or Statement 25).

Statement 27. A device according to Statement 26, where the device is a filtration device.

The steps of the method described in the various embodiments and examples disclosed herein are sufficient to produce films of the present disclosure or carry out a method of using a film or films of the present disclosure. Thus, in an embodiment, a method consists essentially of a combination of the steps of a method disclosed herein. In another embodiment, a method consists of such steps.

The following example is presented to illustrate the present disclosure. The example is not intended to be limiting in any matter.

EXAMPLE

The following is an example of films of the present disclosure, methods of making films and characterization of films, and uses of the films.

Strategy toward Binary Solvent Assisted Surface Segregation. The investigation began with binary blends of polystyrene-b-poly(4-vinylpyridine) (SV; 95 kDa with block volume fraction S:V of 80:20) and polysulfone (PSf; 22 kDa). SV is the most well-investigated di-BCP for $^S$NIPS, and PSf is a frequently used homopolymer for NIPS. Toward SV surface segregation in the blended membrane, 1,4-dioxane (DOX) and N-methyl-2-pyrrolidone (NMP) were selected as SV-selective and PSf-selective solvents, respectively, for generating a binary solvent system. The solvent preferences of SV and PSf were predicted from $\chi_{solvent-polymer}$ parameters based on their Hansen-solubility parameters listed in Table 1 (listing solubility parameters, $\chi_{solvent-polymer}$ parameters, and surface energies of solvents and polymers). $\chi_{DOX-S}$ is much smaller than $\chi_{DOX-PSf}$, while $\chi_{NMP-S}$ is much greater than $\chi_{NMP-PSf}$. Most importantly, NMP-selective V should be shielded from outer environments by forming S-corona/V-core micelles.

TABLE 1

Solubility parameters and surface energies of solvents and polymers.

| Solvent and polymer species | Solubility parameters and molar volume | | | | $\chi_{solvent-polymer}$ [a] | | | surface energy [mJ/m$^2$] |
|---|---|---|---|---|---|---|---|---|
| | $\delta_D$[MPa$^{0.5}$] | $D_P$[MPa$^{0.5}$] | $D_H$[MPa$^{0.5}$] | $V_m$ [mL/mol] | PS | PSf | PES | |
| THF | 16.8 | 5.7 | 8.0 | 81.7 | 0.29 | 0.23 | 0.49 | 26 |
| DOX | 19.0 | 1.8 | 7.4 | 85.7 | 0.28 | 0.44 | 0.75 | 34 |
| DMF | 17.4 | 13.7 | 11.3 | 77.0 | 1.02 | 0.46 | 0.25 | 37 |
| NMP | 18 | 12.3 | 7.2 | 96.4 | 0.56 | 0.15 | 0.16 | 41 |
| PS | 18.7 | 5.9 | 3.5 | — | — | — | — | 40 |
| PSf | 18.7 | 8.8 | 6.1 | — | — | — | — | 40 |
| PES | 19.6 | 10.8 | 9.2 | — | — | — | — | 45 |

[a] $\chi_{solvent-polymer}$ parameters were calculated according to the following equation: $\chi_{solvent-polymer} = V_m / RT[(\delta_{D, solvent} - \delta_{D, polymer})^2 + 0.25(\delta_{p, solvent} - \delta_{p, polymer})^2 + 0.25(\delta_{H, solvent} - \delta_{H, polymer})^2]$ SV and PSf solutions were thus prepared separately, preforming SV micelles, and then mixed them together at variable ratios as shown in FIG. 2. In this picture, despite the similar surface energies of corona-S and PSf, the SV micelles preferentially swollen by DOX could be segregated out at the top surface from the PSf single chains swollen by NMP, as the DOX surface energy is much smaller than that of NMP (Table 1). The assumption of such inhomogeneous distributions of solvents in a polymer solution contradicts conventional treatments of a polymer solution in binary solvents based on the concept of the effective interaction parameters. However, to account for some interesting phenomena in polymer solutions of mixed solvents, e.g. co-solvency and co-nonsolvency, the inhomogeneous distribution of solvents induced by polymers, termed "preferential adsorption" was theoretically predicted. This encouraged tackling of BCP surface segregation phenomena over homopolymers by controlling the solvent surface energies. As discuss below, through a number of control experiments varying parameters in the preparation process of the mixed casting solutions, it was demonstrated that the surface energy of solvents, not that of the polymers, is dominant for controlling the surface segregation observed during the non-equilibrium process of bilayer membrane formation, i.e. during $^S$NIPS.

Bilayered $^S$NIPS Membranes Derived from Binary Solvent Assisted Surface Segregation. 1,4-dioxane:N-methyl-2-pyrrolidone (DOX:NMP) at a 9:1 weight ratio and pure NMP were selected as solvent systems for SV and PSf, respectively (FIG. 2, Steps (a) and (c)). Although the SV micellar structure in such an amphiphilic solvent system is not trivial and still remains controversial, a recent $^1$H nuclear magnetic resonance (NMR) study of SV in tetrahydrofuran:N,N-dimethylformamide (THF:DMF) of 9:1 weight ratio based on spin-spin relaxation analysis supported that V is in the core and S is in the corona with a critical micelle concentration (CMC) somewhere between 0.1 and 0.5 percent by weight. For the SV/DOX/NMP system investigated here V-core S-corona micelles were assumed in analogy to the SV/THF/DMF system. Note that each of $\chi_{DOX\text{-}S}$ and $\chi_{NMP\text{-}S}$ is lower than $\chi_{THF\text{-}S}$ and $\chi_{DMF\text{-}S}$, respectively (Table 1), predicting that the DOX/NMP solvent system should prefer S-corona micelles even more than the THF/DMF solvent system.

Figure 4A:
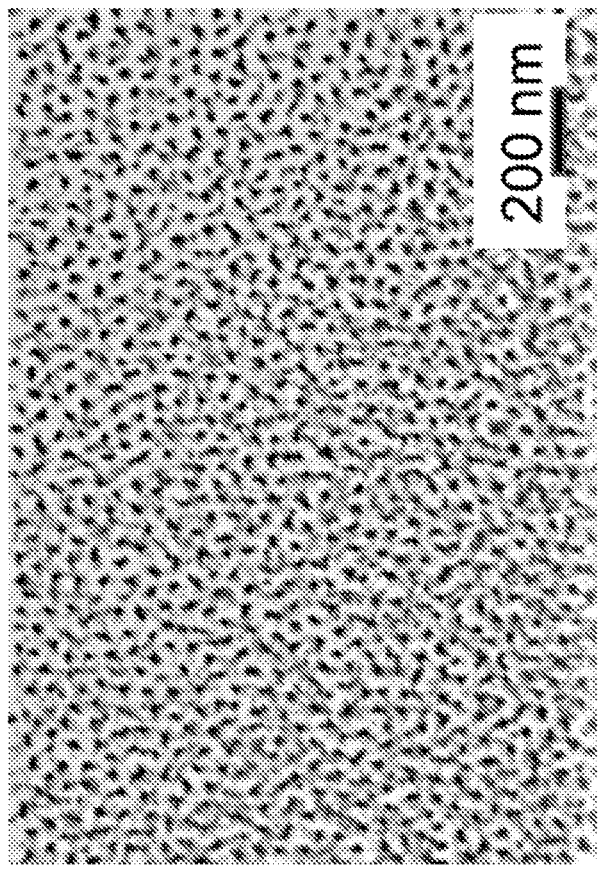
FIGS. 4A-4B show surface SEM images of SV:PSf(+PVP) binary membranes at mixing ratio of 10:90. PSf:PVP ratio is (FIG. 4A) 100:0 and (FIG. 4B) 75:25.
Figure 4B:
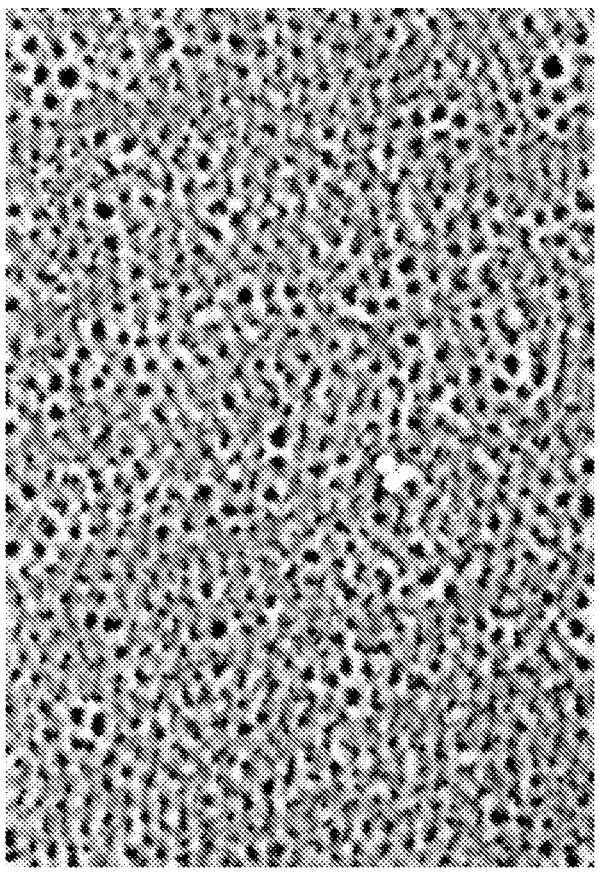

To maintain the S-corona/V-core micelle structure after mixing with solutions of PSf in pure NMP, the V-core was immobilized by metal (II) acetate addition suppressing micellar flipping (FIG. 2, Step (b)). This is essential for BCP surface segregation in binary membranes as shown in FIGS. 3A-3D; the system without metal (II) acetate did not show the BCP self-assembly based pore surface structure probably due to micellar dissociation or flipping in NMP rich solutions. Copper (II) acetate was mainly used for this purpose in our work, but zinc (II) acetate also works, which may be preferred due to lower toxicity. The interactions between V and surrounding solvents/PSf were not further considered assuming the V-core is strongly shielded by the S-corona. Pure NMP was used to generate PSf solutions (FIG. 2, Step (c)) with poly(vinylpyrrolidone) (PVP; 10 kDa) as a water-soluble additive. It has been shown that PVP is miscible with PSf in solution and dissolves away from the final membrane in the water bath, thereby expanding the macro-pores in the substructure and increasing water flux (FIG. 4B). Note that PVP is not essential for SV surface segregation; membranes without PVP additive also gave BCP self-assembly based porous surface structures (FIG. 4A).

Figure 5A:
FIGS. 5A-5B show the appearance of blend solutions of 10:90 SV:PSf (FIG. 5A) right after mixing of the two solutions of SV with Cu (II) acetate in DOX and PSf in NMP and (FIG. 5B) after leaving at rest for one week. A blue color results from Cu(II) which is likely coordinated to the pyridine moieties of SV micelles. Although it is difficult to see from these images, after one week a separate phase with blue color was localized at the upper part of the solution (FIG. 5B), while immediately after mixing the blue color was homogeneously dispersed across the entire solution (FIG. 5A).
Figure 5B:
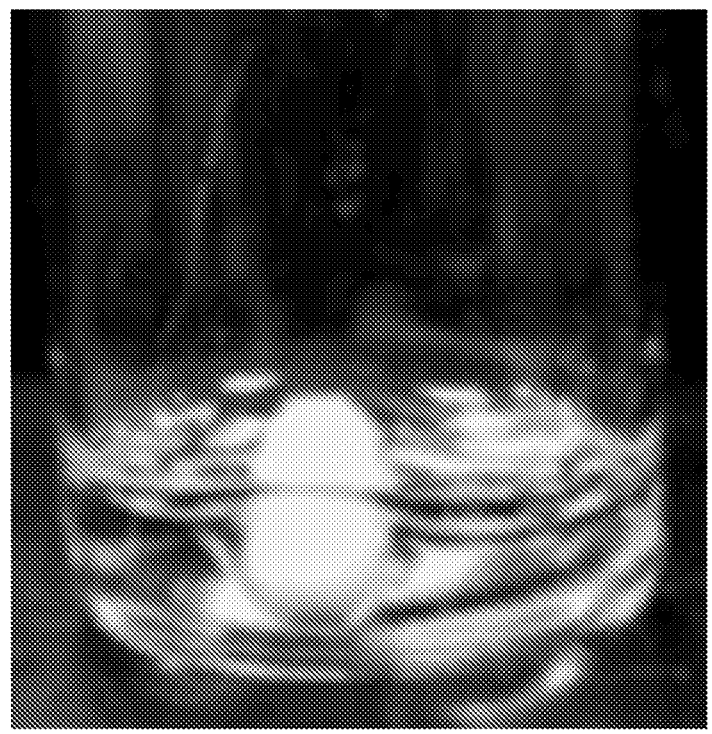

Solutions of SV and PSf+PVP were finally mixed together so that SV:(PSf+PVP) ratios were 10:90, 5:95 and 2:98, respectively (FIG. 2, Step (d)). The blended solutions were clear and appeared homogeneous right after mixing (FIG. 5A). As illustrated in FIG. 2, however, it was hypothesized that these blended solutions are microscopically heterogeneous; SV micelle domains preferentially swollen by DOX form clusters, which are surrounded by the PSf matrix-phase rich in NMP. This hypothesis seems reasonable as S and PSf are immiscible, each of which preferentially adsorbs DOX and NMP, respectively. It is further supported by the fact that this phase separation in the blended solution gradually proceeds to result in visible macro-scale segregation after leaving the solution to rest for one week (FIG. 5B). Moreover, the SV domain clusters were captured in cross-sectional SEM images of the final solidified membranes as discussed below.

Figure 6G:
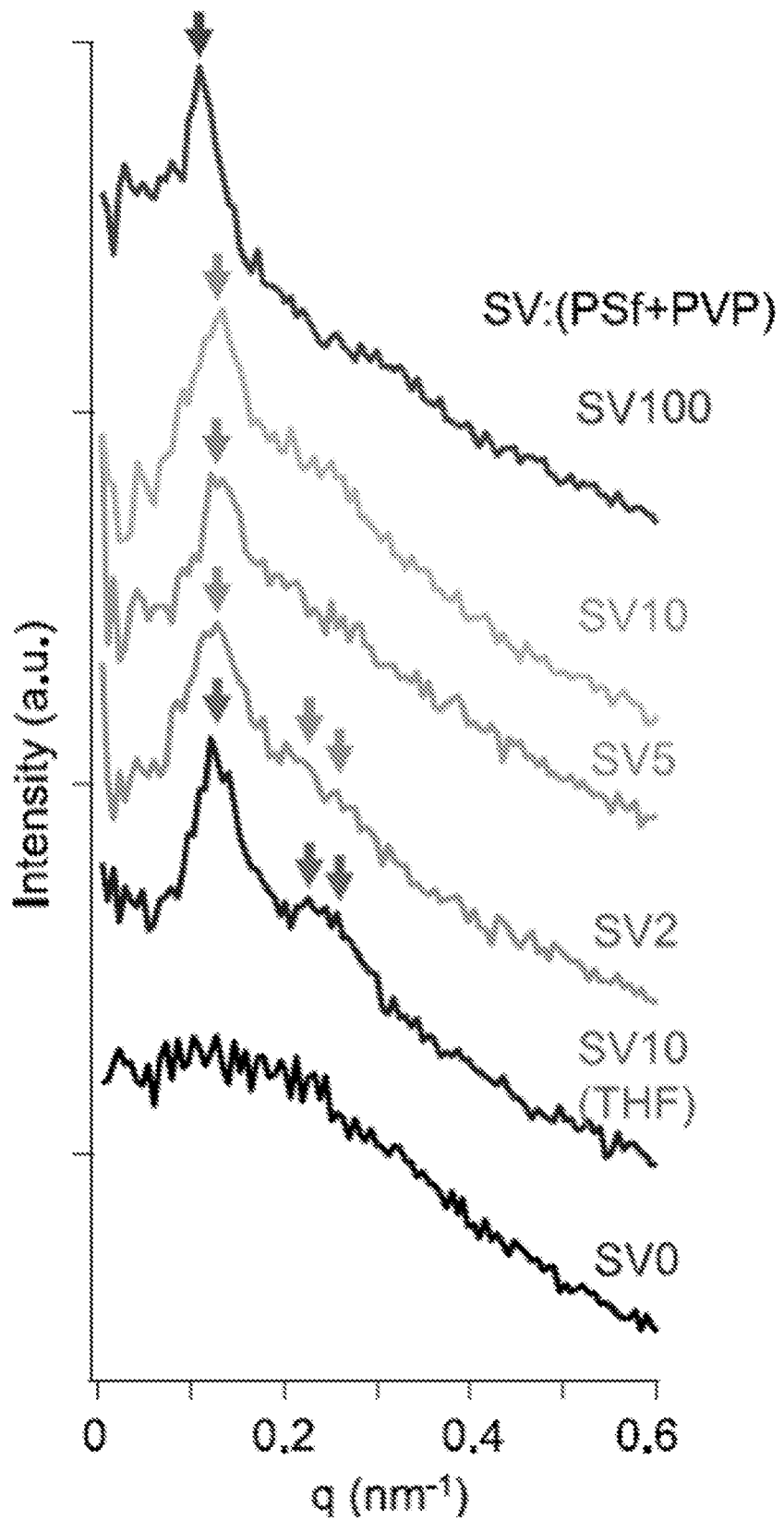
(FIG. 6G) 1D FFT profiles of surfaces images in (FIG. 6A-6F). Arrows indicate distinct peaks at position of $(q/q^*)^2=1, 3, 4$ for hexagonal patterns. q* positions yield d-spacings of 55 nm for SV100, 48 nm for SV1, SV5, SV2, and 49 nm for SV10_THF, respectively. SV0 lacked any characteristic length scale structure.
Figure 6H:
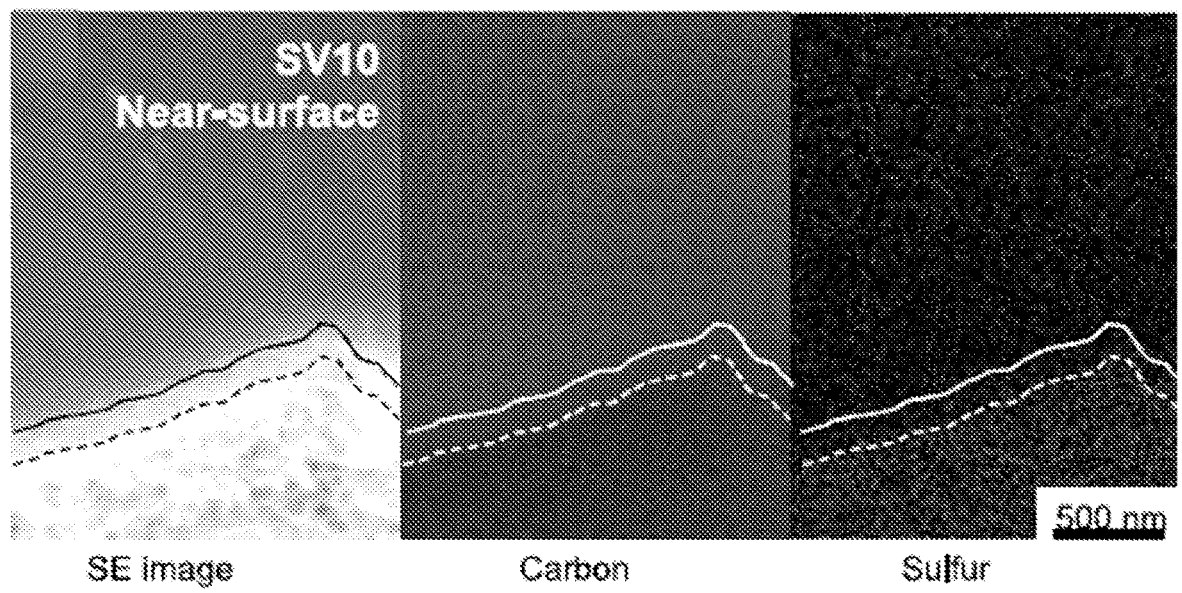
(FIG. 6H-6I) EDX mapping of (FIG. 6H) cross-section of SV10 near-surface and (FIG. 6I) spheres trapped within the substructure of the bilayer membrane. In (FIG. 6H) solid lines show the boundary between surface and cross-section, whereas dashed lines show the boundary between skin-layer and substructure.
Figure 6I:
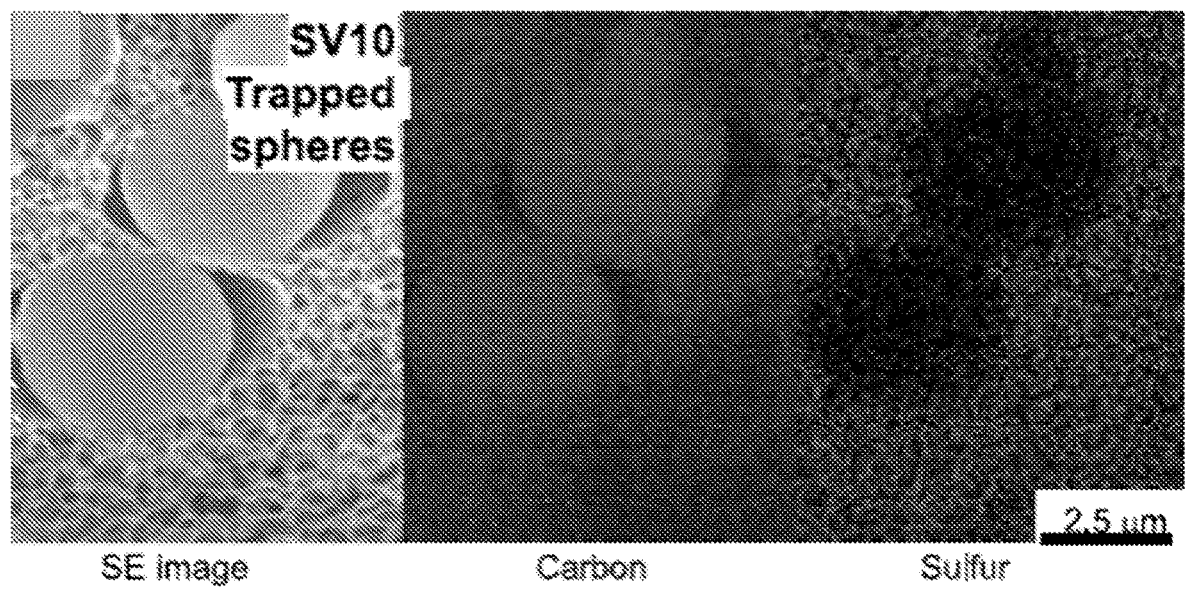
Figures 6J, 6K, 6L:
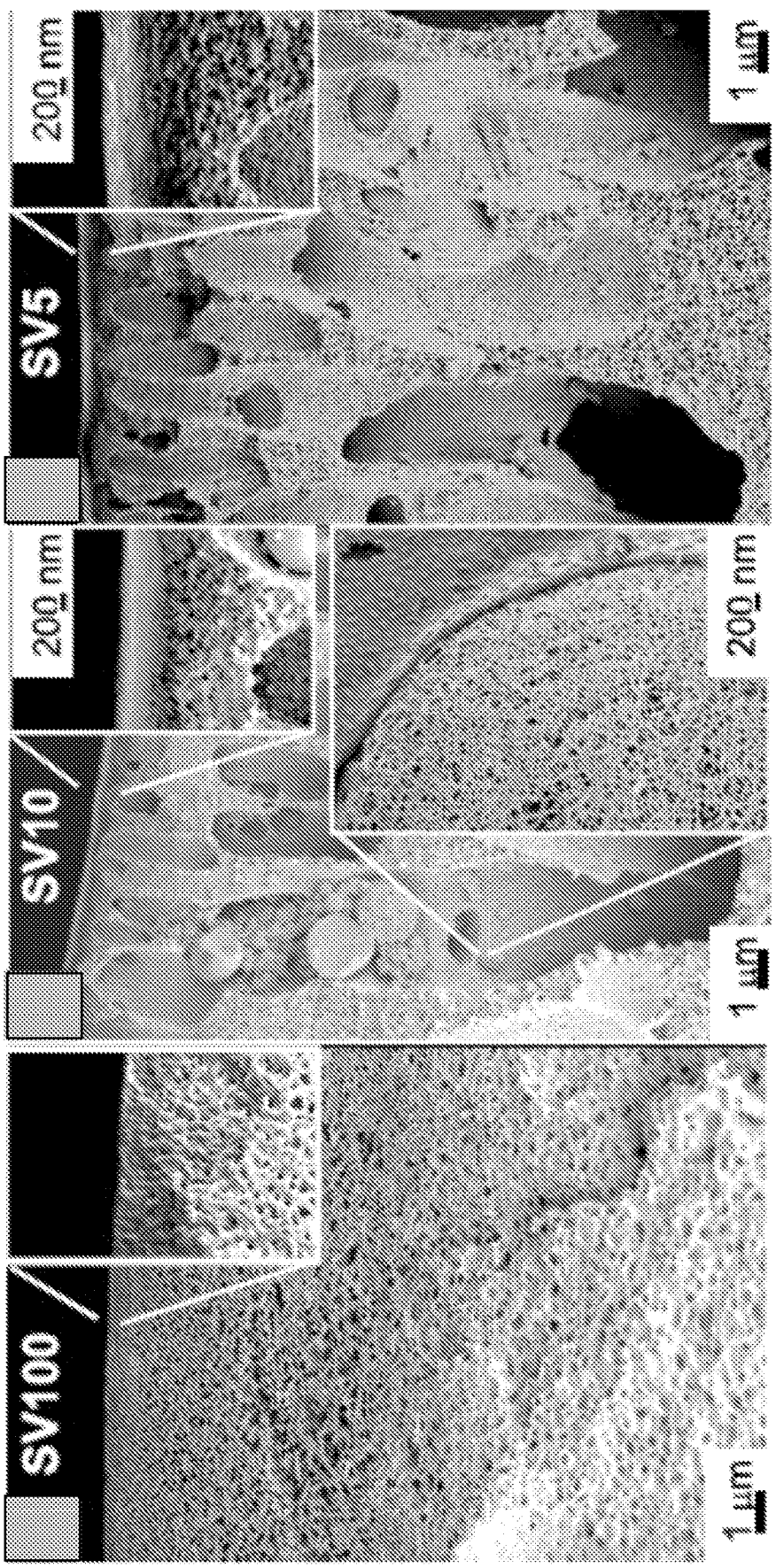
Figures 6M, 6N:
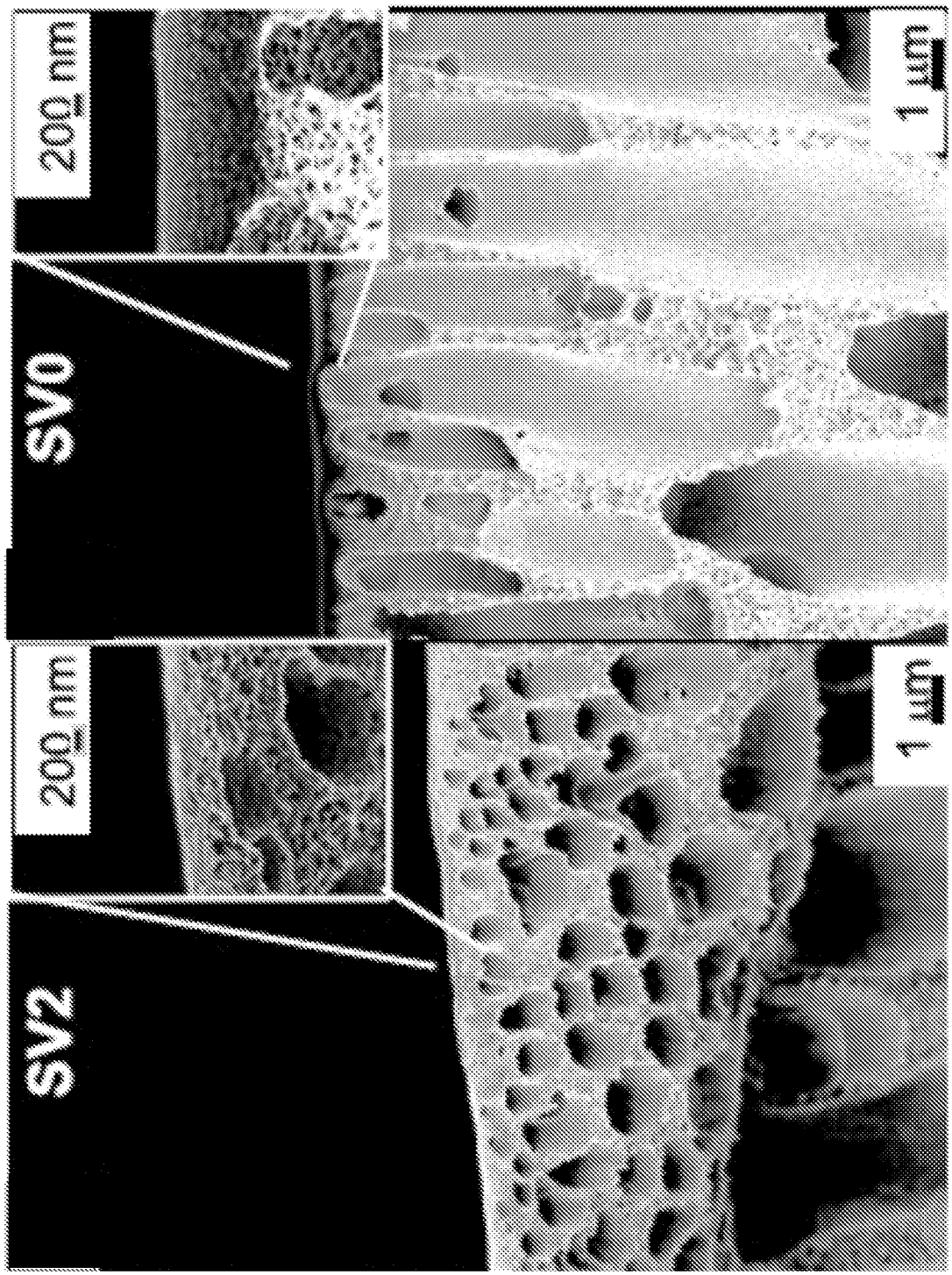
Figure 7:
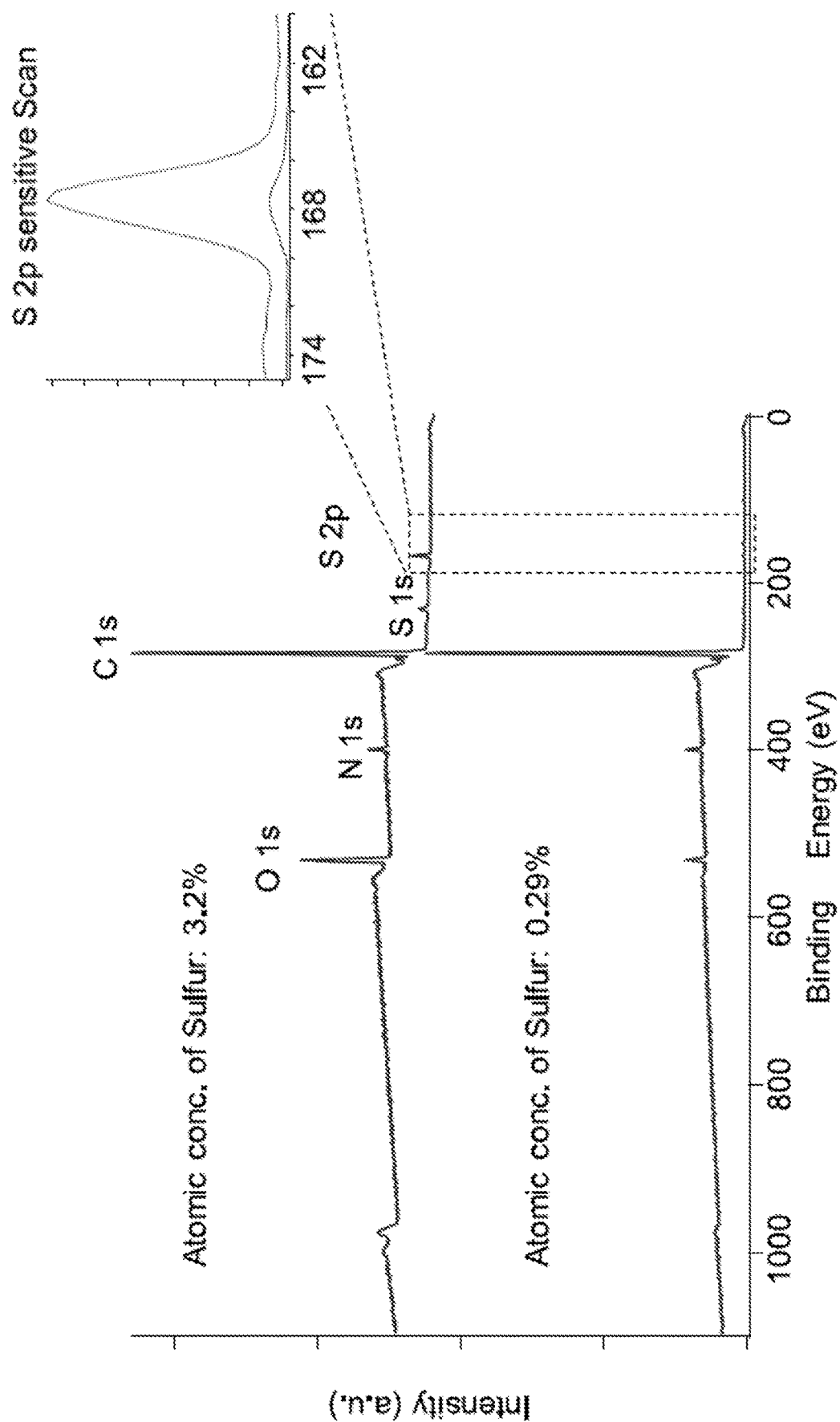
FIG. 7 shows surface XPS of PSf+PVP (top) and 10:90 SV:(PSf+PVP) membrane (bottom). Nitrogen is peak from PSf+PVP membrane indicates not all PVP and/or NMP dissolved away from the membrane (or PSf originally contained some impurities containing nitrogen). PSf content on this membrane surface was 9% (see Table 3).
Figure 8:
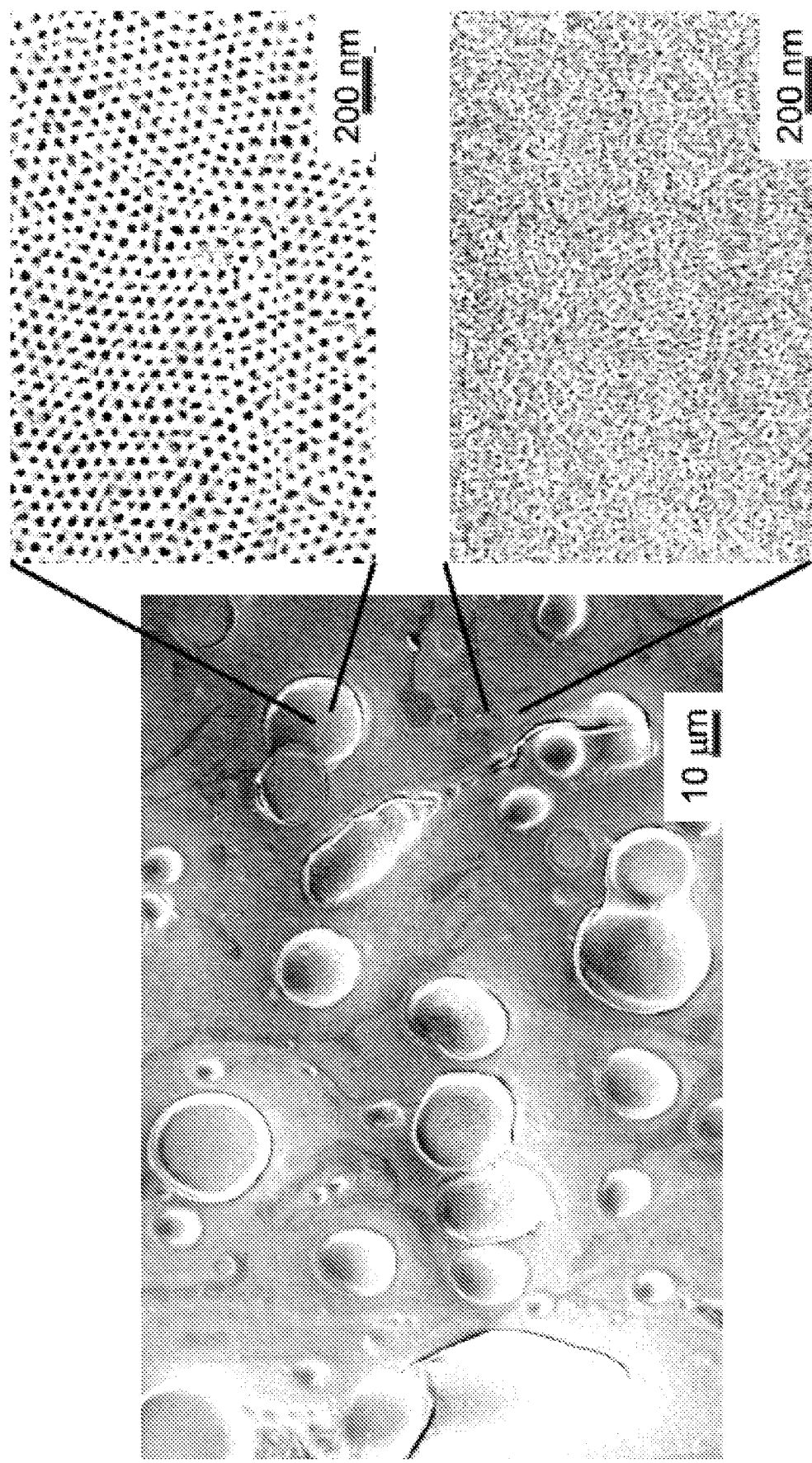
FIG. 8 shows sea-island structure of 10:90 SV:(PSf+PVP) membrane. Casting solution was prepared by mixing SV solution in 9:1 DOX:NMP with Cu(II) acetate and PSf+PVP solution in 5:5 DOX:NMP. Surface coverage by SV is imperfect and the majority of the surface exhibits disordered PSf.

After doctor-blading the blended solutions (gate height around 200 µm), solvents were allowed to evaporate for 40 s and then the entire membrane was immersed into a water bath. It was speculated that during the evaporation time, DOX swollen BCP clusters come up to the surface due to the lower surface energy of DOX as compared to NMP, which selectively swells PSf. The surfaces of the resulting membranes were examined by scanning electron microscopy (SEM, FIG. 6A-6N). In the following, fabricated membranes are denoted by the SV fraction, e.g. SV10 represents the binary membrane at SV:(PSf+PVP) ratio of 10:90. In addition to binary membranes of SV10, SV5, and SV2, pure SV (SV100) and pure PSf+PVP (SV0) membranes were prepared. From FIG. 6A-6N, resulting binary membranes SV10, SV5, and SV2 have high pore density surfaces, with pore correlation peaks as calculated from FFT analysis around 48 nm, which is close to the 54 nm value obtained for SV100 (FIG. 6G). The most highly ordered surfaces (with some hexagonally arrayed pores, FIG. 6E) were obtained when THF/NMP was used (coded as SV10_THF) instead of DOX/NMP in FIG. 2, Step (a), as corroborated by the corresponding FFT in FIG. 6G. BCP surface segregation in membrane SV10 could be demonstrated by scanning electron microscopy with energy dispersive X-ray detection (SEM-EDX, FIG. 6H). The surface has negligible signal from sulfur contained only in PSf, whereas the cross-section shows a strong sulfur signal. Nitrogen could not be used as SV marker probably due to low nitrogen fraction in SV (C:N=98:2 in pure SV) and imperfect removal of PVP and/or NMP. Instead, carbon mapping provided a SV biased distribution because the carbon fraction of SV is 98% and much higher than that of PSf (77%). Using these techniques, BCP-forming skin-layers and PSf-forming substructures could be distinguished. For example, the solid-line in FIG. 6H indicates the boundary between surface and cross-section from SEM, whereas the dashed-line indicates the boundary where sulfur (or carbon) contrast substantially changes. In this way, the thickness of the BCP-forming skin-layer could be estimated to be ~100 nm. Furthermore, quantitative analysis by x-ray photoelectron spectroscopy (XPS) revealed a surface composition of PSf<10 percent by weight (FIG. 7). Membrane cross-sectional SEM characterization showed a bilayer structure with a denser skin layer atop an asymmetric finger-like meso- to macro-porous substructure (FIG. 6J-6N). Examination of cross-sectional SEM images revealed spherical domains with diameters around 1 µm, in particular for high SV fraction membranes (e.g. see SV10 cross section in FIG. 6K). These spherical domains are highly porous as demonstrated in the lower inset of FIG. 6K. Moreover, EDX mapping suggested that these spheres are primarily formed by SV BCP (FIG. 6I). This observation is consistent with our hypothesis of (DOX swollen) BCP-clusters in the blend solutions; some of these BCP clusters will not make it to the surface in time and get trapped inside the membrane upon phase inversion in water. Using pure NMP as solvent for the PSf+PVP solution in FIG. 2, Step (c) is crucial for BCP surface segregation. When the PSf+PVP solution was prepared with a DOX:NMP ratio of 1:1 instead of pure NMP, surface segregation of SV did not occur and a typical "sea-islands" structure was obtained (FIG. 8). These results suggest that the amount of DOX should not significantly exceed what can be uptaken by the SV clusters. Excess DOX may distribute over both of SV and PSf phases, rendering the surface energy difference between the two phases too small to effectively drive BCP surface segregation.

Figure 9A:
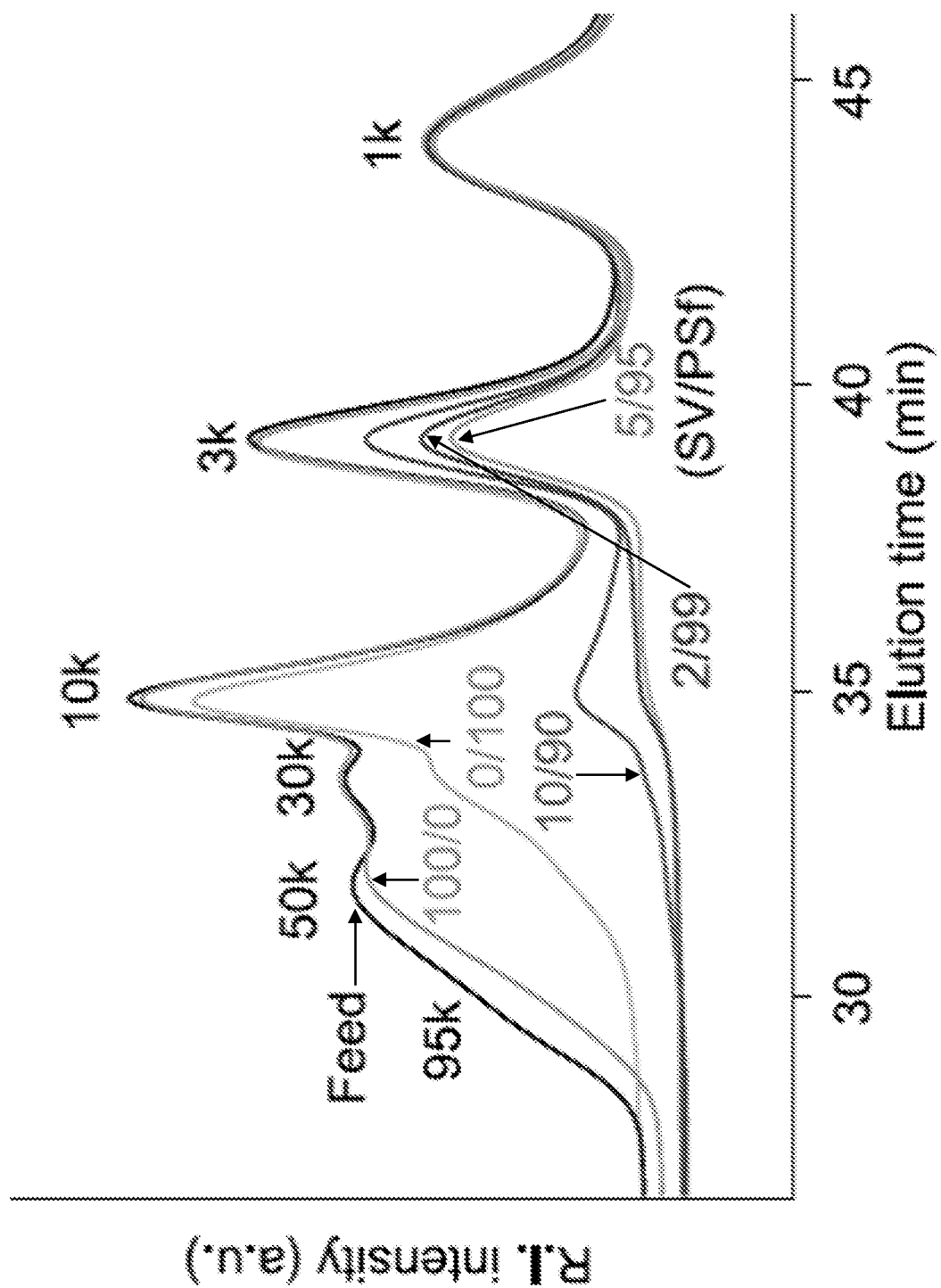
FIGS. 9A-9C show.
Figure 9B:
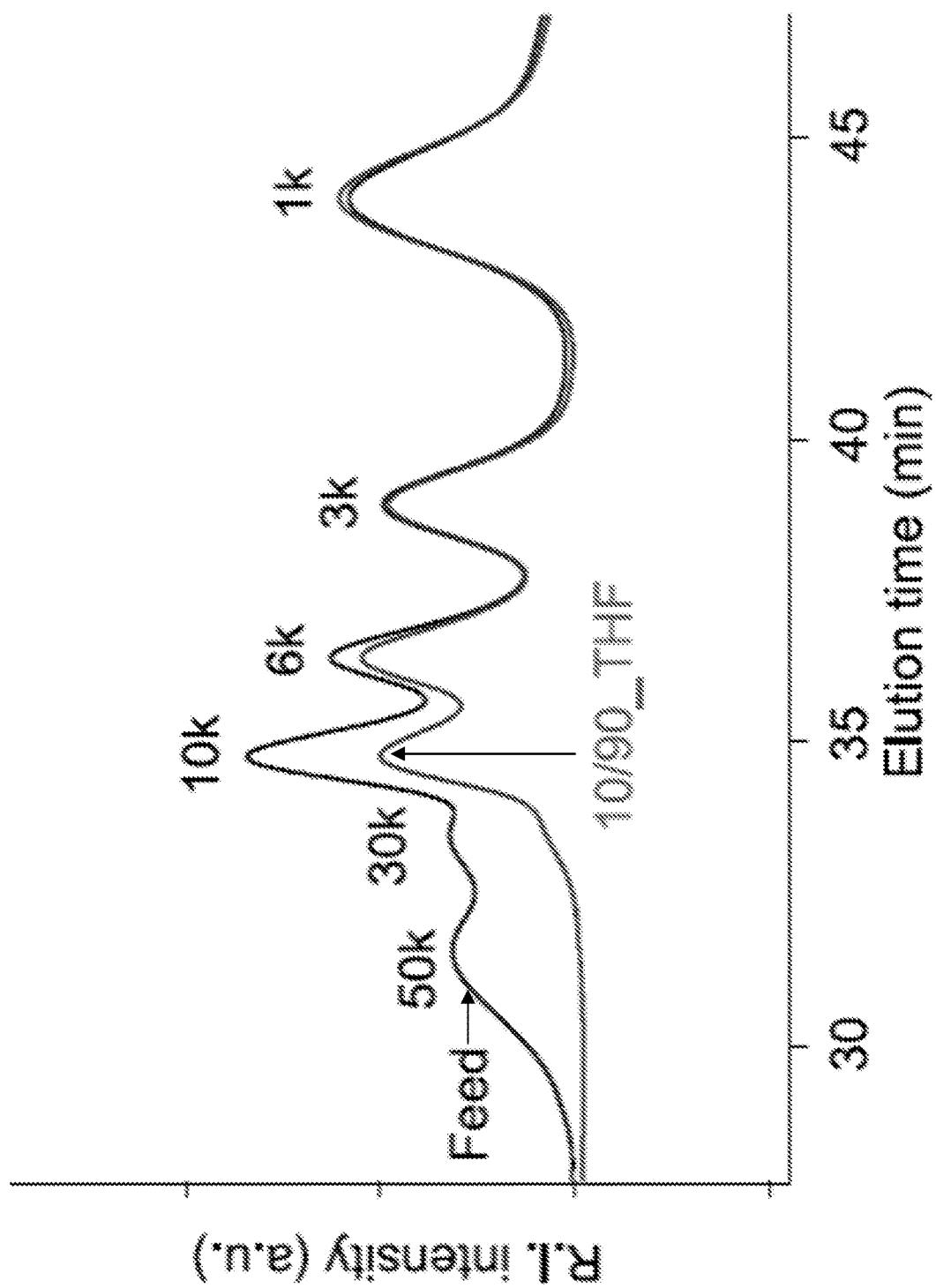
Figure 9C:
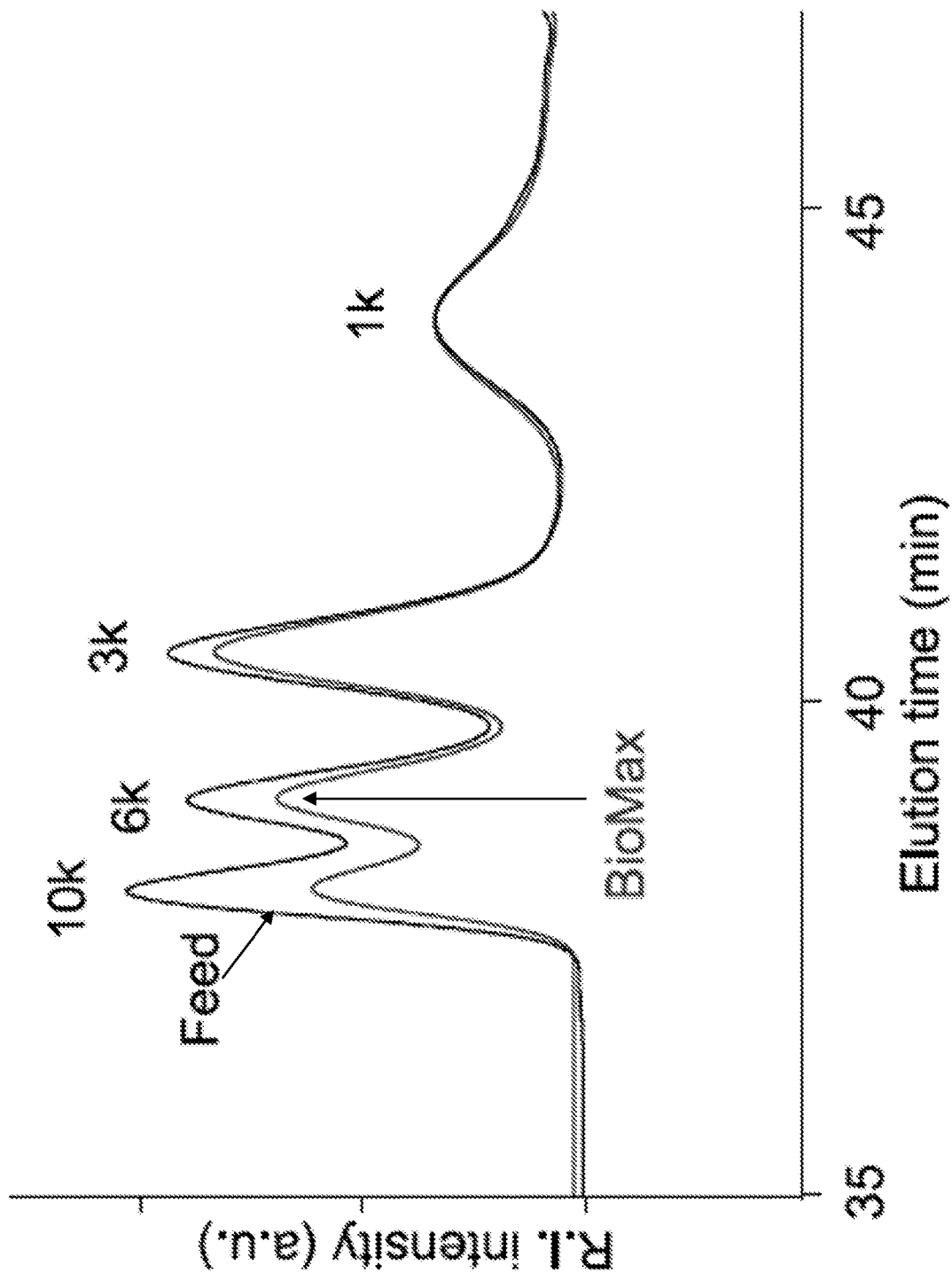
Figure 10A:
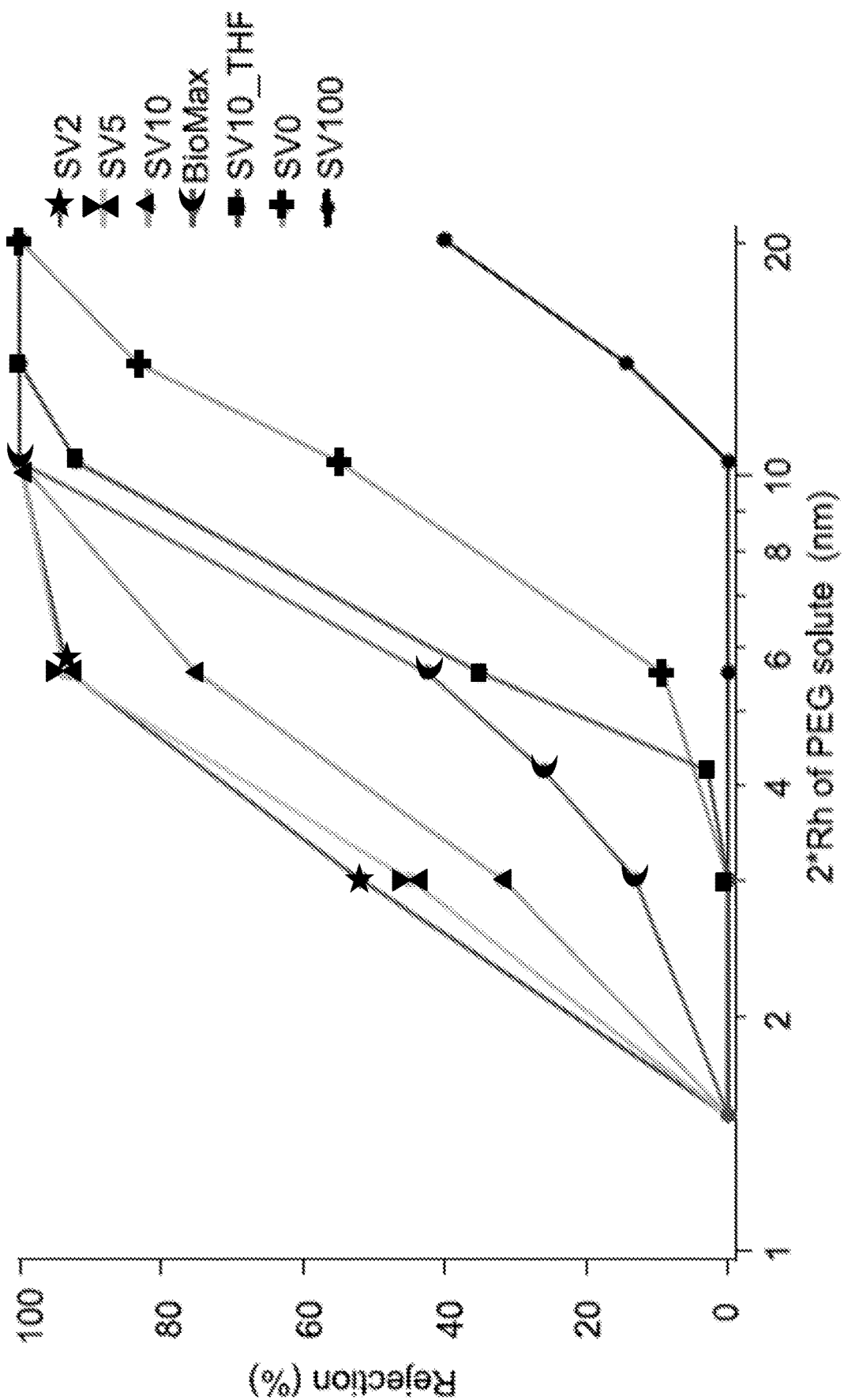
FIGS. 10A-10B show size selective permeation of PEGs of different molar mass.
Figure 10B:
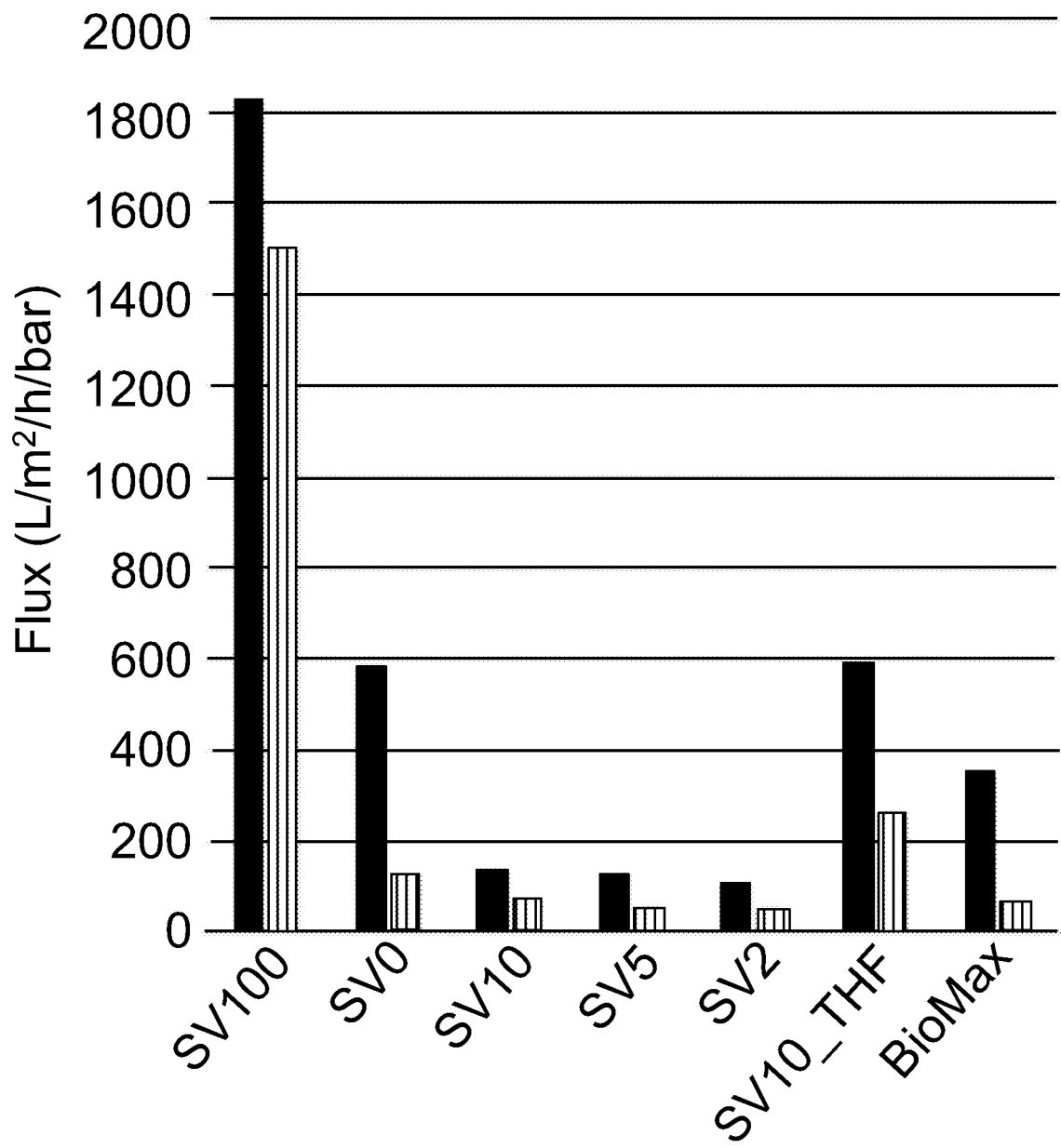

The Separation Performance of Bilayer $^S$NIPS Membranes. The separation performance of binary membranes was tested by size selective permeation of polyethylene glycol (PEG) under applied pressure of 2 psi (0.138 bar). The PEG solutes had varying molar mass: 95 kDa, 50 kDa, 30 kDa, 10 kDa, 3 kDa and 1 kDa, and were kept at 0.04 percent by weight concentration each (total PEG concentration is 0.24 percent by weight). The filtrates were subjected to gel-permeation chromatography (GPC) (FIG. 9A-9C). The reduction of GPC peak area from passing through the membranes provided a measure for the rejection efficiency for each molar mass PEG (FIG. 10A). In addition to the membranes discussed above (i.e. SV100, SV10, SV5, SV2, and SV0 (FIG. 9A)), SV10_THF (FIG. 9B), and commercially available membrane BioMax-PBGC (EMD Millipore Corp; nominal molar mass limit is 10 kDa) (FIG. 9C) were tested for comparison.

respectively) due to the BCP self-assembly based pore surface. Pore diameters were also calculated from solute-rejection data ($d_{rej}$) according to the following Zeman-Wales equation (Equation 1 and Table 2):

$$R = 1-(1-\lambda)^2(2-(1-\lambda)^2)\exp(-0.7146\lambda^2) \quad (1)$$

where R is PEG rejection and the ratio of $d_{rej}/2R_h$, with $R_h$ being the hydrodynamic radius of PEG in water, which was converted from molar mass. The ideal flux ($L_P$) was further estimated based on the following Hagen-Poiseuille equation (Equation 2 and Table 2):

$$L_p = \frac{\varepsilon d_{rej}^2}{32\eta\tau l} \quad (2)$$

where $\varepsilon$ is the porosity, $\eta$ is the viscosity of water, $\tau$ is the pore tortuosity and $l$ is the pore length. Here, a tortuosity of 1 was assumed for vertical cylinder pores and a length of 100 nm, consistent with the BCP skin-layer thickness. Using the estimated pore size from rejection performance ($d_{rej}$), the calculated ideal flux ($L_P$) indicates the maximum flux of the membrane with this rejection range. The ideal flux of SV100 is more than 10 times higher than the observed flux, similar to other BCP SNIPS derived UF membrane performance reported before and suggesting significant contributions to flow resistance from membrane substructure. On the other hand, the flux observed for binary $^S$NIPS membranes is relatively close to ideal flux, in particular for the smallest BCP weight fractions tested (i.e., SV5 and SV2) and the one casted from THF/NMP. These results can be rationalized by the structural differences in membrane top surface and

TABLE 2

Structural parameters and permeation performance of SV:PSf binary $^S$NIPS derived membranes casted from DOX/NMP solutions and a THF/NMP solution as compared to a SV derived SNIPS and NIPS membranes and a commercially available membrane BioMax.

| Membranes | SV:(PSf + PVP) weight ratio | Porosity[%] | $d_{SEM}$ [a] [nm] | $d_{rej}$ [b] [nm] | Ideal Flux [c] [LMHB] | Flux [d] [LMHB] |
|---|---|---|---|---|---|---|
| SV100 | 100:0 | 20 | 27 ± 7 | 32 | 23000 | 1800 |
| SV0 | 0:100 | 25 | 14 ± 7 | 23 | 15000 | 750 |
| SV10 | 10:90 | 7.8 | 15 ± 4 | 12 | 1260 | 140 |
| SV5 | 5:95 | 6.9 | 12 ± 4 | 10 | 770 | 130 |
| SV2 | 2:98 | 4.4 | 12 ± 4 | 10 | 490 | 110 |
| SV10_THF [e] | 10:90 | 8.6 | 16 ± 4 | 17 | 2800 | 590 |
| BioMax [f] | — | — | — | 15 | — | 350 |

[a] Porosity and pore size determined by surface SEM image analysis.
[b] Pore size determined by solute rejection test.
[c] Ideal flux (L/m²/h/bar: LMHB) predicted from pore size. Rejection derived pore size, $d_{rej}$, was used for pore size.
[d] Observed flux under 0.138 bar.
[e] Casted from THF/NMP solution.
[f] Commercially available polyethersulfone (PES) membrane from Millipore.

Binary membranes SV10, SV5, and SV2 show much better rejection efficiency and resolution than SV100 (pure SV) or SV0 (pure PSf), consistent with surface pore diameter analysis from SEM images ($d_{SEM}$): SV100 has $d_{SEM}$ of 27±7 nm, whereas binary SV10, SV5, SV2, and SV10_THF membranes have $d_{SEM}$ of 15±4 nm, 12±4 nm, 12±4 nm, and 1±4 nm respectively. From this analysis, SV0 has $d_{SEM}$ of 14±7 nm, similar to those of the bilayer membranes. But the standard deviation of the pore size is larger resulting in lower rejection efficiency and resolution. SV10_THF has a similar rejection range as BioMax, but better flux and resolution (FIG. 10A square- and moon-labelled curves, substructures. Pure BCP membranes often exhibit sponge-like substructures with higher resistance to flow, as indeed observed for SV100 in FIG. 6J. Despite the larger pore size, significantly increasing the expected flux, this membrane therefore shows the largest discrepancy between ideal and measured flux. In contrast, binary membranes formed finger-like substructures as shown for SV10, SV5, and SV2 in FIGS. 6K-6M, which contribute less to flow resistance. While their smaller pore sizes therefore decrease overall flux relative to SV100, the deviations between ideal and measured flux are substantially smaller.

Versatility of Binary Solvent Assisted Surface Segregation. In order to bring out the key factors inducing membrane surface segregation, a number of control experiments were performed on simpler test systems. A polystyrene homopolymer (PS; 8 kDa) instead of an SV BCP was employed and combined with PSf without PVP. The PS/PSf binary membrane was prepared in the same manner as depicted in FIG. 2: PS in DOX (20 percent by weight) and PSf in NMP (20 percent by weight) were mixed together so that the ratio of PS:PSf was 10:90, and then this blend solution was submitted to the NIPS process. Cross-section solvent system with similar surface energies (PS10_DOX/DMF) did show effective surface segregation. Quenching the casted solution on time is not necessary for surface segregation. The membrane PS10_LongEvapo, which was not quenched right after casting and solidified by evaporation over 30 minutes, also showed a similar level of surface segregation as compared to PS10, which was quenched after 40 s.

TABLE 3

PSf surface composition of binary membranes. Mixing solutions of polymer 1 and polymer 2 at specific mixing ratios by weigh were first casted and subsequently quenched after 40 s evaporation time. The membrane surface was analyzed by XPS after leaving the membrane in water more than a day and subsequent drying under vacuum.

| Membrane Name | Polymer1 | Polymer2 | MixingRatio (Poly1/Poly2) | Atomic Concention (%) | | | | PSf fraction on the surface[a] | Enrichment efficiency on the surface[b] |
|---|---|---|---|---|---|---|---|---|---|
| | | | | Carbon | Nitrogen | Oxygen | Sulfur | | |
| PSf | PSf + PVP in NMP | — | — | 83.8 | 2.4 | 10.6 | 3.2 | | |
| SV100 | SV in NMP1/DOX9 | — | — | 96.8 | 2.5 | 0.7 | 0.0 | | |
| SV10 | SV in NMP1/DOX9 | PSf + PVP in NMP | 10/90 | 94.8 | 2.3 | 2.6 | 0.3 | 0.09 | 9.1 |
| SV5 | SV in NMP1/DOX9 | PSf + PVP in NMP | 5/95 | 94.3 | 3.0 | 2.4 | 0.3 | 0.10 | 18 |
| SV2 | SV in NMP1/DOX9 | PSf + PVP in NMP | 2/98 | 91.8 | 3.1 | 4.3 | 0.8 | 0.25 | 38 |
| SV10_THF | SV in NMP1/THF9 | PSf + PVP in NMP | 10/90 | 94.4 | 2.8 | 2.6 | 0.2 | 0.06 | 9.4 |
| PS10 | PS in DOX | PSf in NMP | 10/90 | 93.4 | 1.6 | 4.9 | 0.2 | 0.07 | 9.3 |
| PS10_DOX/DMF | PS in DOX | PSf in DMF | 10/90 | 88.1 | 0.2 | 8.5 | 3.2 | 0.96 | 0.4 |
| PS10_NMP | PS in NMP | PSf in NMP | 10/90 | 87.2 | 1.1 | 8.9 | 2.8 | 0.87 | 1.3 |
| PS10_DOX | PS in DOX | PSf in DOX | 10/90 | 88.6 | 0.0 | 8.7 | 2.7 | 0.83 | 1.7 |
| PS10_ShorEvapo[c] | PS in DOX | PSf in NMP | 10/90 | 98.3 | 0.2 | 0.9 | 0.3 | 0.09 | 9.2 |
| PS10_LongEvapo[d] | PS in DOX | PSf in NMP | 10/90 | 94.1 | 1.7 | 4.0 | 0.3 | 0.08 | 9.2 |

[a]Calculated based on the following equation: $S_{mix}/C_{mix} = f * S_{PSf}/(f * C_{PSf} + (1 - f)C_{SV})$ where f is fraction of PSf on the membrane surface, $S_{mix}$ and $S_{PSf}$ are sulfur atomic concentrations on binary and pure PSf membranes, respectively, and $C_{mix}$, $C_{PSf}$ and $C_{SV}$ are carbon atomic concentrations on binary, pure PSf, and pure SV membranes, respectively.
[b]Surface enrichment efficiency of SV or PS over PSf. Calculated by dividing SV (PS) fraction on surface by mixing fraction.
[c]Short evaporation time (10 sec) before quenching.
[d]Long evaporation time (30 min) before quenching. The casted solution got white and looked solidified before immersion in water.

Figure 11A:
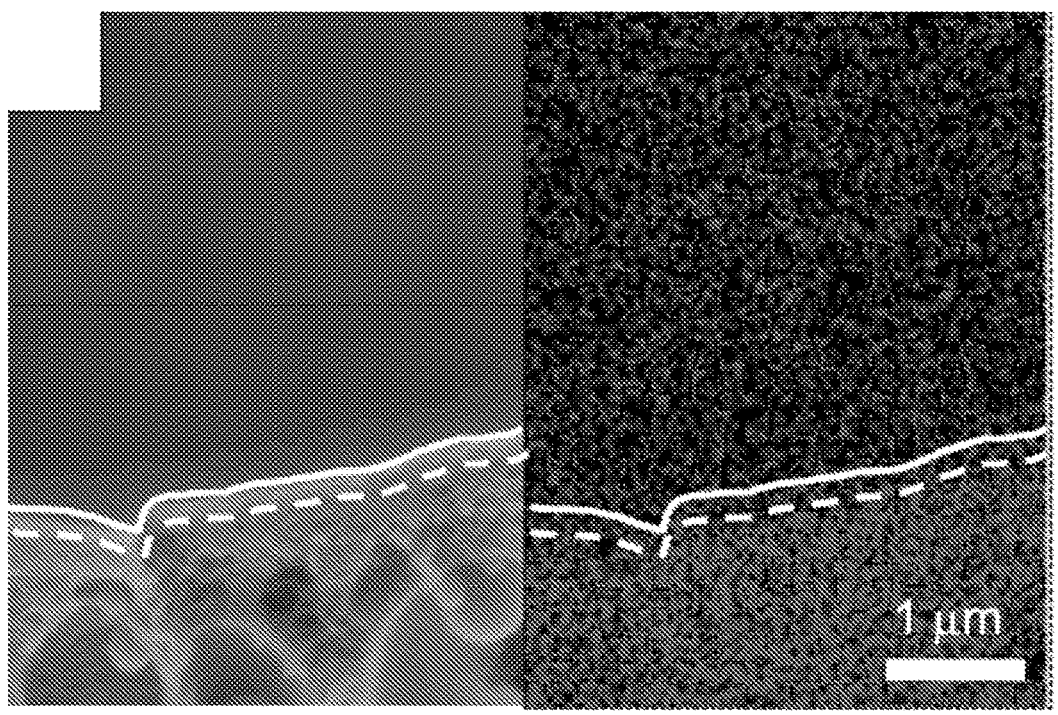
FIGS. 11A-11E show bilayer $^S$NIPS derived membranes of PS:PSf and SAA:PSf at a mixing ratio of 10:90.
Figure 11B:
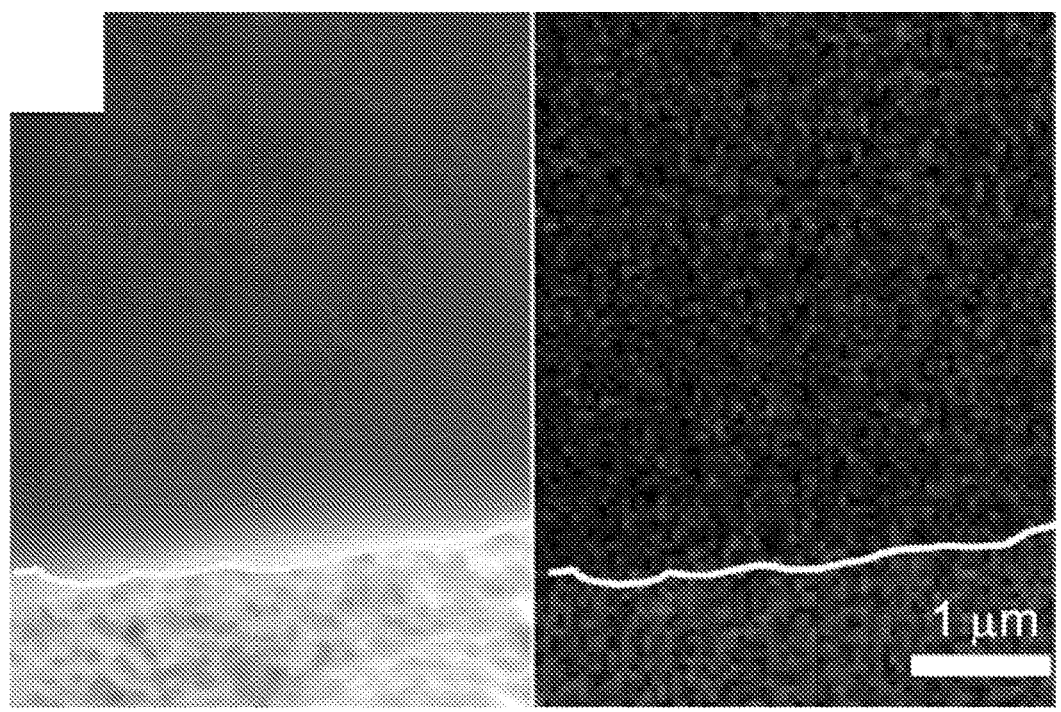
Figure 11C:
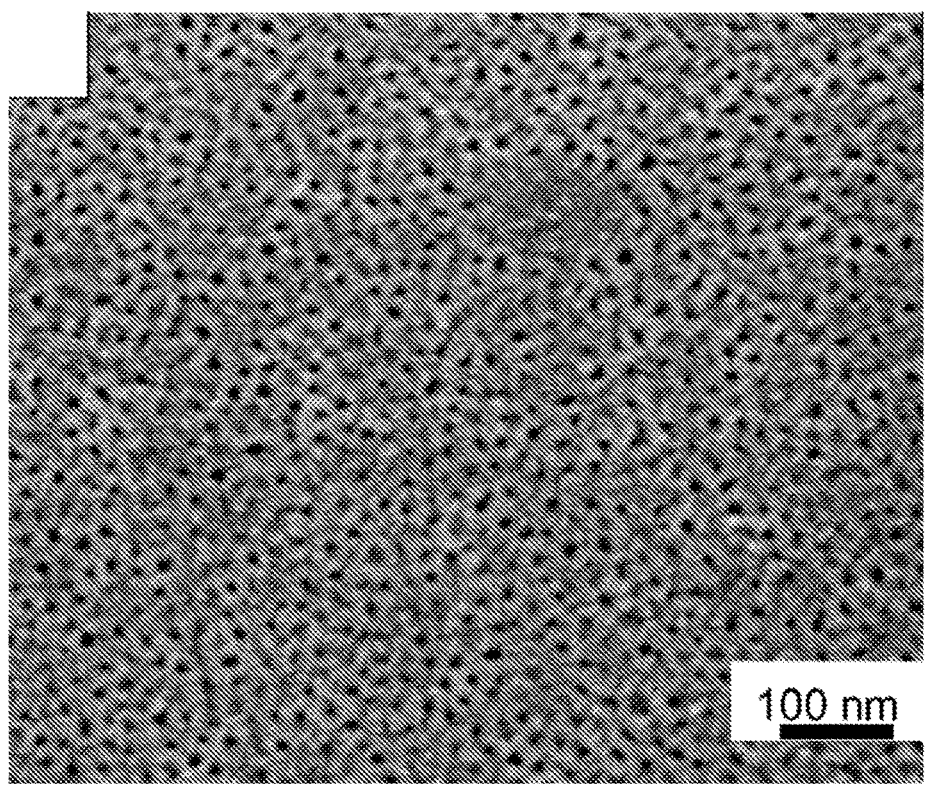
Figure 11D:
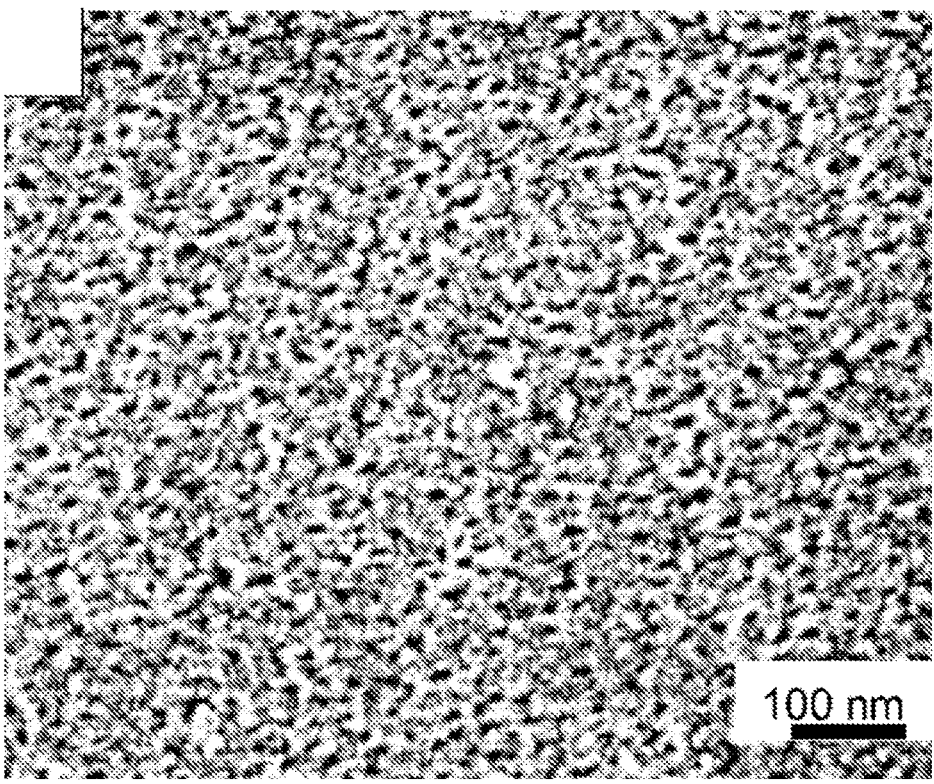
Figure 11E:
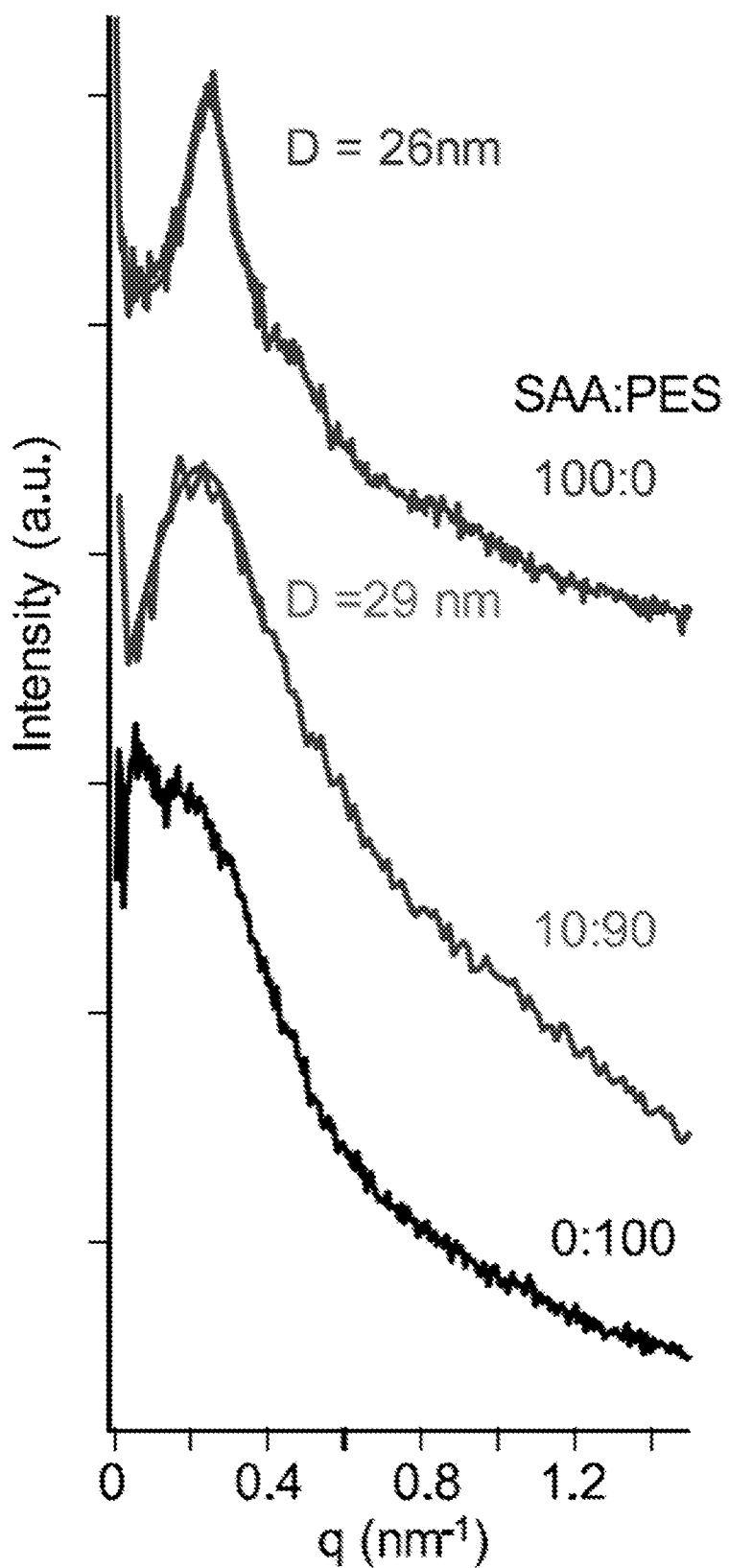
Figure 12:
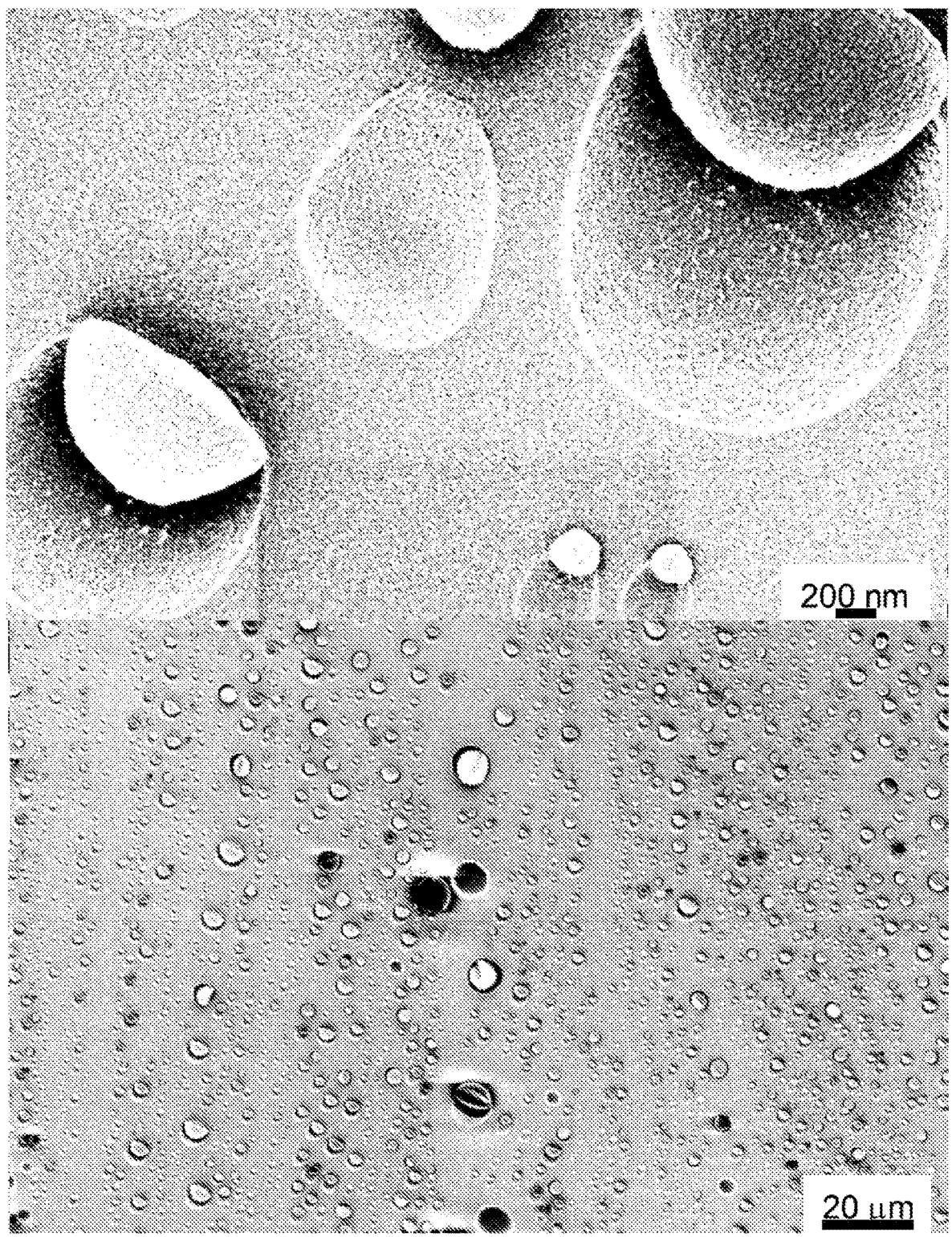
FIG. 12 shows SEM images of PS/PSf binary membrane surfaces casted from DOX/DMF system at different magnifications.

EDX analysis of the resulting membrane clearly showed PS surface segregation (FIG. 11A). This result suggests that BCP micelle surface segregation was not primarily induced by entropy effects discussed earlier, which are expected to be stronger in BCP micelles placing more chain ends at the phase boundary than in a homopolymer. When the solvent was changed from a binary system to a single solvent (i.e. both PS and PSf were dissolved in the same solvent, either DOX or NMP), typical "sea-islands" surface structures were obtained (data not shown). Moreover, a binary solvent system derived from PS in DOX and PSf in DMF also gave "sea-islands" membrane surface structure, although DMF is a PSf selective solvent like NMP (Table 1 and FIG. 12). It was concluded that this is because the surface energies of DOX (33 mJ/m$^2$) and DMF (37 mJ/m$^2$) are too close, and hence surface segregation of PS clusters swollen by DOX was not sufficiently driven by surface tension to generate fully closed surface layers of PS over a PSf substructure swollen by DMF. These results all support the hypothesis of a binary solvent assisted surface segregation. More quantitative and systematic analysis of surface segregation was conducted by XPS, which also supported this hypothesis (See Table 3, listing PSf surface composition of binary membranes). Table 3 clearly shows that the binary solvent system with two very different surface energies the key for surface segregation of SV or PS over PSf. Neither a single solvent system (PS10_DOX or PS10_NMP) nor a binary Note that long evaporation times leading to solidified films before immersing in water also show fine surface segregation, expanding the application range of this strategy toward dried films. Finally, to show whether the method can be extended to other BCP/homopolymer systems, BCP polystyrene-b-poly (acrylic acid) (SAA; 28 kDa (PS)-5 kDa (PAA)) was combined with homopolymer poly (ether sulfone) (PES; 75 kDa). A 10:90 binary membrane of SAA: PES was fabricated in the same manner as depicted schematically in FIG. 2 (see detailed description herein). Surface structure analysis of the resulting binary membrane suggested surface segregation of SAA. While this could not directly be evidenced in cross-section EDXexperiments (FIG. 11B), the membrane surface showed high pore density (compare FIGS. 1C-11D) and a characteristic correlation peak as obtained from FFT of SEM images at 29 nm, close to the pure SAA membrane with 2 nm membrane was too fragile for practical use. However, by mixing with substructure-forming PES, mechanical stability could be provided to the binary membrane without loss of surface structure. This is a further advantage of our bilayer $^S$NIPS method in addition to single process/low-cost and superior performance in separation applications.

Thus, the strategy described herein to control surface segregation in a non-equilibrium process was applied to prepare bilayer NIPS derived membranes constituted from a BCP self-assembly derived surface separation layer atop a disordered asymmetrically porous homopolymer substructure. The process, referred to as $^S$NIPS, allowed very small amounts of BCP (down to 2 percent by weight) to significantly improve the membrane performance in separation applications ensuring high flux and size-selective resolution. The key for this strategy is employing binary solvents with very different surface energies, each of which is preferentially adsorbed by one of the two constituent polymers, respectively. The constituent selectively swollen by the solvent with lower surface energy within a timescale of order of a minute comes up to the surface during the solvent evaporation process. In this way, the surface segregation can be controlled between two polymers with almost identical surface energies. The versatility of this strategy was examined in a set of BCP/homopolymer and homopolymer/homopolymer combinations. Surface segregation was also maintained during long evaporation times yielding dried films, expanding the application range of this strategy toward general film technologies. Overall, the presented strategy provides a methodology for controlling surface segregation especially in a non-equilibrium approach leading to ultrafiltration membranes. The $^S$NIPS process may be a significant step toward industrial use of BCP based ultrafiltration membranes by substantially reducing the amount of required BCP while maintaining improved flux and resolution relative to more cost-effective pure homopolymer based NIPS membranes.

Experimental Section/Methods. Polymers, Chemicals and Materials. Polymers. BCP SV (123 kDa (PS)-27 kDa (P4VP); PDI<1.1) was synthesized by living anionic polymerization and characterized by NMR and GPC as described herein. The SAA (28 kDa (PS)-5 kDa (PAA); PDI<1.1), PSf (22 kDa), and PVP (10 kDa) were purchased from Sigma Aldrich. PES (Ultrason E6020P; 75 kDa; PDI=3.4) was kindly provided by BASF Corporation. 95 kDa, 50 kDa, 30 kDa, and 10 kDa PEGs were bought from Polymer Source Inc. The other two PEGs with 3 kDa and 1 kDa molar mass were purchased from Sigma Aldrich. Commercially available BioMax PBGC was purchased from Millipore and pretreated as directed by the supplier before use. Chemicals. All chemicals were purchased from Sigma Aldrich and used without further purification if not specially mentioned. NMP was dried over 4 Å molecular sieves.

Procedure for living anionic polymerization for SV. SV was synthesized via sequential anionic polymerization under vacuum. THF and monomers were distilled over different drying agents right before use: n-butyl lithium for THF, di-n-butyl magnesium for styrene, and ethyl-aluminum dichloride for 4-vinyl pyridine. First, styrene polymerization was initiated with sec-BuLi at −78° C. in THF, and after 4 h, 4-vinyl pyridine was added and further stirred for 2 h. The polymerization was quenched with degassed methanol, and the polymer then precipitated in 2-isopropanol. After drying under vacuum at 80° C., SV was characterized with a combination of $^1$H NMR and GPC.

Membrane Fabrication. A typical procedure for fabrication of SV/PSf binary membranes via $^S$NIPS is described here. SV (54 mg) was dissolved in DOX:NMP with 9:1 weight ratio (24 mg) and kept stirred overnight. Copper (II) acetate (10 mg) was dissolved in NMP (1 g) at 70° C., and 54 mg of resulting solution was added to SV solution (SV:Copper is 100:1 in weight). The SV/copper solution was further stirred overnight. PSf (90 mg) and PVP (30 mg) were dissolved in NMP (600 mg) in a separate vial and stirred overnight. To the resulting PSf/PVP solution, 88 mg of SV solution was added so that the ratio of SV:(PSf/PVP) was 10:90. After stirring for 30 mins, the blended solution was casted on a glass-slide by a doctor-blade at blade gate height of 200 μm. Temperature (15-20° C.) and humidity (30-40%) were roughly controlled by working in a Plexiglas box. After 40 seconds of evaporation time post doctor-blading, the casted solution was inserted into an ice-cold water bath. This quickly solidified the casted solution yielding a membrane.

PSIPS/binary membrane. PS was dissolved in DOX and PSf without PVP was dissolved in NMP (20 percent by weight for each). After stirring overnight, these two solutions were blended so that the ratio of PS:PSf was 10:90. After stirring for 30 mins, the solution was casted and precipitated after 40 second evaporation time in a water bath as for the SV/(PSf+PVP) binary membranes.

SAAIPES binary membrane. SAA (50 mg) was dissolved in DOX (150 mg) and stirred overnight. To this solution, 3 percent by weight Cu(II) acetate in NMP (50 mg) was added. After stirring for 2 hours, the solution was heated up to 70° C. and kept stirred for 15 mins. The solution was cooled down to r.t. and further stirred overnight. Separately, PES (75 kDa; 50 mg) was dissolved in NMP (150 mg) and stirred overnight. To this PES solution, 28 mg of SAA solution was added so that the final SAA:PES ratio was 10:90. After stirring for 30 mins, the solution was casted and precipitated after 40 second evaporation time in a water bath as described for the SV/(PSf+PVP) binary membranes.

Permeation Experiments. Membranes were tested in a stirred cell (Amicon 8010; Millipore) and pure water flux was measured under 2 psi pressure. The water was then discarded, and 5 mL PEG solution of 95 kDa, 50 kDa, 30 kDa, 10 kDa, 3.4 kDa and 1 kDa PEGs was introduced. The concentration of each PEG solute was 0.04 percent by weight. Filtration was performed under 2 psi pressure and 400 rpm stirring. The filtrate was subjected to GPC to calculate rejection efficiency. Commercially available BioMax PBGC was purchased from Millipore and pretreated as directed by the manufacturer before use.

Instrumentation. GPC was operated with Agilent ChemStation for LC systems with G1362A RID detector at 50° C. with DMF as eluent. The SEM sample was Au-Pd sputtered with 20 mA current for 8 sec before observation. SEM images were taken on a Zeiss Gemini 500 with in-lens probe at 1 kV acceleration voltage and 20 m aperture. For EDX analysis, 5 kV acceleration voltage and 120 μm aperture was applied.

Although the present disclosure has been described with respect to one or more particular examples, it will be understood that other examples of the present disclosure may be made without departing from the scope of the present disclosure.

The invention claimed is:

1. A method for forming a film comprising an isoporous surface region and an asymmetric pore region, wherein the isoporous surface region is disposed on at least a portion of an exterior surface of the asymmetric pore region, comprising:

forming a first film from a deposition solution comprising
one or more multiblock copolymer(s),
one or more homopolymer(s),
two or more solvents, and
optionally, one or more metal salt(s),
allowing the first film to stand for a period of time such that at least a portion of the two or more solvents is removed from the film and at least a portion of the one or more multiblock copolymer(s) migrates to an exterior surface of the first film and a second film is formed; and contacting the second film with a phase separation solvent system, such that the film comprising an isoporous surface region and an asymmetric pore region is formed.

2. The method of claim 1, wherein the one or more multiblock copolymer(s) comprise about 10 percent by weight or less of the deposition solution (based on the total weight of multiblock copolymer(s) and homopolymer(s) present in the deposition solution) and/or the one or more homopolymer(s) comprise about 90 percent by weight or more of the deposition solution (based on the total weight of multiblock copolymer(s) and homopolymer(s) present in the deposition solution).

3. The method of claim 1, wherein the at least two of the two or more solvents have different surface energy and/or surface tension and a lower surface energy and/or surface tension solvent preferentially solubilizes the one or more multiblock copolymer(s) relative to the one or more homopolymer(s).

4. The method of claim 1, wherein the method comprises:
providing a first polymer solution comprising one or more first polymer(s) and one or more first solvent(s), wherein the first polymer solution optionally further comprises a metal salt;
providing a second polymer solution comprising one or more second polymer(s) and one or more second solvent(s), wherein the second polymer solution optionally further comprises a salt,
wherein the solvent of the polymer solution comprising the one or more multiblock copolymer(s) has a lower surface energy and/or surface tension than the solvent of the polymer solution comprising the one or more homopolymer(s) and/or the solvent of the polymer solution comprising the one or more multiblock copolymer(s) preferentially solubilizes the one or more multiblock copolymer(s) relative to the one or more homopolymer(s).

5. The method of claim 1, wherein the pores of the isoporous surface region have a pore size distribution of about less than 3, wherein the pore size distribution is the ratio of the maximum pore diameter ($d_{max}$) to the minimum pore diameter ($d_{min}$).

6. The method of claim 1, wherein the isoporous surface region has a thickness of about 20 nm to about 500 nm, a plurality of pores having a size of about 5 nm to about 100 nm, and
the asymmetric pore region has a thickness of about 5 microns to about 500 microns and pores having a size of about 10 nm to about 50 microns.

7. The method of claim 1, wherein the isoporous surface region comprises a plurality of the pores about 5 nm to about 100 nm in size and/or a pore density of at least about $1\times10^{14}$ pores/m$^2$.

8. The method of claim 1, wherein at least a portion of the pores of the asymmetric pore region increases in size along a dimension of the film moving away from a surface of the isoporous surface region in contact with the asymmetric pore region towards an opposite surface of the asymmetric pore region.

9. The method of claim 1, wherein a plurality of the pores in the asymmetric pore region lying on a plane about 20 microns from the isoporous surface region and parallel to interface between the isoporous surface region and asymmetric pore region have a size in the plane of at least about 5 microns.

10. The method of claim 1, wherein at least a portion of the pores in the asymmetric pore region have an aspect ratio of greater than about 2.

11. The method of claim 1, wherein at least a portion of the pore surface in the asymmetric pore region is mesoporous.

12. The method of claim 1, wherein the concentration of the one or more multiblock copolymer(s) and the one or more homopolymer(s) in the deposition solution is about 5 to about 30 percent by weight (based on the total weight of the deposition solution).

13. The method of claim 1, wherein at least one multiblock copolymer or all of the multiblock copolymers comprises one or more hydrogen-bonding block(s).

14. The method of claim 1, wherein at least one multiblock copolymer or all of the multiblock copolymers further comprises one or more low $T_g$ block(s).

15. The method of claim 1, wherein the one or more homopolymer(s) is/are chosen from polysulfanes, polypropylenes, polylactic acids, polysulfones, poly (ether sulfone) s, poly (phenyl sulfone) s, cellulose acetates, poly (acrylonitrile) s, poly (amide) s, and any combination thereof.

16. The method of claim 1, wherein the deposition solution further comprises inorganic nanoparticles.

17. The method of claim 1, wherein the two solvents comprise solvents chosen from 1,4-dioxane, tetrahydrofuran, methanol, ethanol, toluene, chloroform, dimethylformamide, acetone, dimethylsulfoxide, N-methyl pyrrolidone, and any combination thereof.

18. The method of claim 1, wherein the deposition further comprises one or more small molecule(s) and the film further comprises the one or more small molecule(s).

19. The method of claim 1, further comprising depositing one or more inorganic materials on at least a portion of a surface of the film.

20. The method of claim 19, wherein the inorganic material is a plurality of metal nanoparticles, wherein the metal nanoparticles comprise one or more metal(s).

21. The method of claim 1, wherein the first film is formed on a substrate, the method further comprising separating the film from the substrate to form a free-standing film.

22. The method of claim 1, wherein
the one or more multiblock copolymer(s) is polystyrene-b-poly (4-vinylpyridine), the one or more homopolymer(s) is polysulfone or poly (ether sulfone), and the two solvents are 1,4-dioxane or THF and N-methylpyrrolidone (NMP),
the one or more multiblock copolymer(s) is polystyrene-b-poly (acrylic acid), the one or more homopolymer(s) is poly (ether sulfone), and the two solvents are 1,4-dioxane or THF and N-methyl pyrrolidone,
the one or more multiblock copolymer(s) is polyisoprene-b-polystyrene-b-poly (4-vinylpyridine), the one or more homopolymer(s) is poly (ether sulfone), and the two solvents are 1,4-dioxane or THF and N-methyl pyrrolidone,
the one or more multiblock copolymer(s) is polystyrene-b-poly (ethylene oxide), the one or more homopolymer (s) is poly (ether sulfone), and the two solvents are 1,4-dioxane or THF and N-methyl pyrrolidone,
the one or more multiblock copolymer(s) is polystyrene-b-P4VP, the one or more homopolymer(s) is poly (ether sulfone), and the two solvents are 1,4-dioxane or THF and N-methyl pyrrolidone, the one or more multiblock copolymer(s) is polystyrene, the one or more homopolymer(s) is polysulfone, and the two solvents are 1,4-dioxane or THF and N-methyl pyrrolidone, the one or more multiblock copolymer(s) is polyisoprene-b-polystyrene-b-P4VP, the one or more homopolymer(s) is polysulfane or poly (ether sulfone), and the two solvents are 1,4-dioxane or THF and N-methyl pyrrolidone, or the one or more multiblock copolymer(s) is polystyrene-b-polyethylene oxide, the one or more homopolymer(s) is polysulfane or poly (ether sulfone), and the two solvents are 1,4-dioxane or THF and N-methyl pyrrolidone.

* * * * *